US007649831B2

(12) United States Patent
Van Rensburg et al.

(10) Patent No.: US 7,649,831 B2
(45) Date of Patent: Jan. 19, 2010

(54) MULTI-USER MIMO FEEDBACK AND TRANSMISSION IN A WIRELESS COMMUNICATION SYSTEM

(75) Inventors: Cornelius Van Rensburg, Dallas, TX (US); Jianzhong Zhang, Irving, TX (US); Farooq Khan, Allen, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 245 days.

(21) Appl. No.: 11/979,266

(22) Filed: Oct. 31, 2007

(65) Prior Publication Data

US 2008/0298482 A1 Dec. 4, 2008

Related U.S. Application Data

(60) Provisional application No. 60/924,819, filed on May 31, 2007, provisional application No. 60/942,761, filed on May 30, 2007.

(51) Int. Cl.
*H04J 11/00* (2006.01)
(52) U.S. Cl. ............... 370/203; 370/210; 370/208; 370/328; 375/140
(58) Field of Classification Search ............... None
See application file for complete search history.

(56) References Cited

U.S. PATENT DOCUMENTS

| | | | | |
|---|---|---|---|---|
| 7,218,948 | B2* | 5/2007 | Laroia et al. ............... | 455/522 |
| 2005/0068884 | A1* | 3/2005 | Yoon et al. ................. | 370/203 |
| 2007/0115796 | A1* | 5/2007 | Jeong et al. ................. | 370/203 |
| 2007/0195908 | A1* | 8/2007 | Attar et al. ................. | 375/267 |
| 2007/0253386 | A1* | 11/2007 | Li et al. ..................... | 370/338 |
| 2007/0254603 | A1* | 11/2007 | Li et al. ..................... | 455/88 |
| 2007/0280386 | A1* | 12/2007 | Waes et al. ................. | 375/347 |
| 2008/0049596 | A1* | 2/2008 | Khojastepour et al. ...... | 370/203 |
| 2008/0080364 | A1* | 4/2008 | Barak et al. ................. | 370/210 |
| 2008/0108310 | A1* | 5/2008 | Tong et al. .................. | 455/69 |
| 2008/0151804 | A1* | 6/2008 | Wang et al. ................. | 370/312 |
| 2008/0165875 | A1* | 7/2008 | Mundarath et al. .......... | 375/262 |
| 2008/0212460 | A1* | 9/2008 | Sampath ..................... | 370/203 |
| 2008/0229177 | A1* | 9/2008 | Kotecha ...................... | 714/776 |
| 2008/0268785 | A1* | 10/2008 | McCoy et al. ............. | 455/67.11 |
| 2009/0060064 | A1* | 3/2009 | Futaki et al. ............... | 375/260 |

* cited by examiner

*Primary Examiner*—Bob A Phunkulh

(57) ABSTRACT

The present invention provides a method for feedback and transmission of multi-user (MU) multiple input multiple output (MIMO) in a wireless communication system. The method includes steps of selecting subset codebook or full code book based on traffic load of a base station, and broadcasting the selected codebook to user equipments. In high traffic load, subset codebook is selected, and in low traffic load, full codebook is selected. User stations calculated a channel quality indicator of a spatial codeword vector that is included in the selected codebook. Information of the maximum channel quality indicator is sent to the base station together with a precoder of the user equipment. The base station selects user equipments based on the information of the maximum channel quality indicator and precoder, and transmits precoder signal and data signal to the user equipments. The present invention also provides a system for the base station that causes the base station to perform the above mentioned operations.

21 Claims, 18 Drawing Sheets

| 0-3 | 4-15 | 16-39 | 40-63 |
|---|---|---|---|
| Rank-1 | Rank-2 | Rank-3 | Rank-4 |
| 1 | 1,2 | 1,2,3 | 1,2,3,4 |
| 2 | 1,3 | 1,2,4 | 1,2,4,3 |
| 3 | 1,4 | 1,3,2 | 1,3,2,4 |
| 4 | 2,1 | 1,3,4 | 1,3,4,2 |
|   | 2,3 | 1,4,2 | 1,4,2,3 |
| LOI=4 | 2,4 | 1,4,3 | 1,4,3,2 |
|   | 3,1 | 2,1,3 | 2,1,3,4 |
|   | 3,2 | 2,1,4 | 2,1,4,3 |
|   | 3,4 | 2,3,1 | 2,3,1,4 |
|   | 4,1 | 2,3,4 | 2,3,4,1 |
|   | 4,2 | 2,4,1 | 2,4,1,3 |
|   | 4,2 | 2,4,3 | 2,4,3,1 |
|   |   | 3,1,2 | 3,1,2,4 |
|   | LOI=12 | 3,1,4 | 3,1,4,2 |
|   |   | 3,2,1 | 3,2,1,4 |
|   |   | 3,2,4 | 3,2,4,1 |
|   |   | 3,4,1 | 3,4,1,2 |
|   |   | 3,4,2 | 3,4,2,1 |
|   |   | 4,1,2 | 4,1,2,3 |
|   |   | 4,1,3 | 4,1,3,2 |
|   |   | 4,2,1 | 4,2,1,3 |
|   |   | 4,2,3 | 4,2,3,1 |
|   |   | 4,3,1 | 4,3,1,2 |
|   |   | 4,3,2 | 4,3,2,1 |
|   |   | LOI=24 | LOI=24 |

FIG. 9

| Rank-1 | Rank-2 | Rank-3 | Rank-4 |
|---|---|---|---|
| 1 | 1,2 | 1,2,x | 1,2,x,x |
| 2 | 1,3 | 1,3,x | 1,3,x,x |
| 3 | 1,4 | 1,4,x | 1,4,x,x |
| 4 | 2,1 | 2,1,x | 2,1,x,x |
|   | 2,3 | 2,3,x | 2,3,x,x |
|   | 2,4 | 2,4,x | 2,4,x,x |
|   | 3,1 | 3,1,x | 3,1,x,x |
|   | 3,2 | 3,2,x | 3,2,x,x |
|   | 3,4 | 3,4,x | 3,4,x,x |
|   | 4,1 | 4,1,x | 4,1,x,x |
|   | 4,2 | 4,2,x | 4,2,x,x |
|   | 4,3 | 4,3,x | 4,3,x,x |
| LOI=4 | LOI=12 | LOI=12 | LOI=12 |

FIG. 10

$$H(\mathbf{u}_1) = \frac{1}{\sqrt{4}} \begin{bmatrix} 1 & j & 1 & -j \\ -j & 1 & 1 & 1 \\ 1 & -j & j & 1 \\ j & 1 & -j & 1 \end{bmatrix}$$

| User-C | User-A | User-D | User-B |
|--------|--------|--------|--------|
| User-D | User-C | User-A | User-B |

MULTI-USER MIMO FEEDBACK AND TRANSMISSION IN A WIRELESS COMMUNICATION SYSTEM

CLAIM OF PRIORITY

This application makes reference to, incorporates the same herein, and claims all benefits accruing under 35 U.S.C. §119 from provisional applications earlier filed in the U.S. Patent & Trademark Office on the 30 May 2007 and there duly assigned Ser. No. 60/924,761, and filed on the 31 May 2007 and assigned Ser. No. 60/924,819.

BACKGROUND OF THE INVENTION

1. Field of the Invention

The present invention relates to a method for feedback and transmission scheme of multi-user (MU) multiple input multiple output (MIMO) in a wireless communication system. The method of the present invention provides processes for operating a base station in a multi-user MIMO configuration. The present invention also provides a base station that operates according to the feedback and transmission scheme of the present invention.

2. Description of the Related Art

A multiple antenna communication system, which is often referred to as multiple input multiple output (MIMO) system, is widely used in combination with orthogonal frequency division multiplexing (OFDM) technology in a wireless communication system to improve system performance.

A MIMO system uses multiple transmit antennas and multiple receive antennas to improve the capacity and reliability of a wireless communication channel. Therefore, the transmitter is capable of transmitting independent data streams simultaneously in the same frequency band. MIMO technology increases the spectral efficiency of a wireless communication system by exploiting an additional dimension of freedom in a space domain due to multiple antennas. A MIMO system promises linear increase in capacity with K where K is the minimum of number of transmit (M) and receive antennas (N) i.e. K=min(M,N). In a simplified example of a 4×4 MIMO system, four different data streams are transmitted separately from the four transmit antennas. The transmitted signals are received at the four receive antennas. Some form of spatial signal processing is performed on the received signals in order to recover the four data streams. An example of spatial signal processing is V-BLAST which uses the successive interference cancellation principle to recover the transmitted data streams. Other variants of MIMO schemes include schemes that perform some kind of space-time coding across the transmit antennas (e.g. D-BLAST) and also beamforming schemes such as spatial division multiple access (SDMA).

One of the disadvantages of the single-user MIMO PARC scheme is that multiple channel quality indicator (CQI) estimates are required for each of the individual streams. This results in excessive signaling overhead resulting in system inefficiency. In case of multi-user MIMO approach, it is possible to implement PARC scheme with just one CQI feedback per user. In this case, each user reports the best CQI determined by using, for example, a minimum mean square error (MMSE) algorithm along with the MIMO stream identity. However, multi-user MIMO requires that a large number of users are present in the system so that each user can be selected for transmission when it experiences best channel quality. However, when the number of users in the system is small, it is less likely to find users at their peak channel conditions and thus degrading the performance of a multi-user MIMO scheme. In other words, in a fixed configuration of a multi-user MIMO scheme, the performance of the multi-user MIMO system will degrade with few users. Therefore, it is necessary to provide a MIMO scheme that improves the performance of the MIMO system regardless of the number of users in a cell.

SUMMARY OF THE INVENTION

In the present invention, a method of operating a base station in a multi-user multiple input multiple output (MU-MIMO) configuration is provided.

One of the objectives of the present invention is to provide a method for feedback and transmission in a MIMO system that improves the performance of the MIMO system even when a small number of users are present.

According to one aspect of the present invention, a method for feedback and transmission in a wireless communication system is provided. The method includes steps of selecting at a base station one of a subset codebook and a full codebook where the selected codebook has at least one spatial codeword vector that represents a codeword, broadcasting the selected codebook to at least one user equipment from the base station, calculating at the user equipment a channel quality indicator of the spatial codeword vector, sending a feedback signal from the user equipment to the base station where the feedback signal includes information of the channel quality indicator of the spatial codeword vector and a preferred precoder of the user equipment, assigning at the base station a first spatial codeword vector to the user equipment, and transmitting the preferred precoder of the user equipment and data to the user equipment.

The method can further include steps of selecting at the user equipment a largest channel quality indicator among the calculated channel quality indicators. The information of the channel quality indicator included in the feedback signal includes the largest channel quality indicator. The assigned first spatial codeword vector corresponds to the largest channel quality indicator for the user equipment. The method may further include steps of reporting via the user equipment a preferred spatial codeword vector to the base station. The preferred spatial codeword vector corresponds to the largest channel quality indicator.

The step of s electing one of the subset codebook and the full codebook can include steps of estimating traffic load, selecting subset codebook if a high traffic load is estimated, and selecting full codebook if a low traffic load is estimated.

The step of selecting one of the subset codebook and the full codebook can be semi-statically operated.

If the subset codebook is selected, the method can further includes steps of generating a plurality of subset codebooks, and selecting, via a base station, a subset codebook from the plurality of subset codebooks.

The base station can have at least one first antenna. The size of the selected codebook is equal to or less, than the number of the first antenna.

The feedback signal may include an index of channel quality indicator gaps, a precoding vector index, a rank and layer index, a layer index, a first decreased layer index, an index of cumulative channel quality indicator gaps, a second decreased layer index, or the combinations thereof.

According to another aspect of the present invention, a method for feedback and transmission in a wireless communication system includes steps of selecting at a base station one of a subset codebook and a full codebook where the selected codebook has a plurality of spatial codeword vectors, each of which represents a codeword, broadcasting the selected codebook to a plurality of user equipments from the base station, calculating, at each of the user equipments, channel quality indicators of the spatial codeword vectors, sending a feedback signal from each of the user equipments to the base station where the feedback signal of the each of the user equipments includes information of the channel quality indicators and a preferred precoder of the each of the user equipments, selecting at the base station a first group of user equipments among the plurality of the user equipments where each of the user equipments in the first group is assigned with a first spatial codeword vector, and transmitting the preferred precoder of the each of the user equipments in the first group and data for the each of the user equipments in the first group.

According to another aspect of the present invention, a base station for a wireless communication system is provided. The base station, during communication with a plurality of user equipments, performs operations including steps of selecting one of a subset codebook and a full codebook where the selected codebook has a plurality of spatial codeword vectors, each of which represents a codeword, broadcasting the selected codebook to the plurality of user equipments where channel quality indicators of the spatial codeword vectors are calculated at each of the user equipments, receiving a feedback signal from each of the user equipments where the feedback signal of the each of the user equipments includes information of the channel quality indicators and a preferred precoder of the each of the user equipments, selecting a first group of user equipments among the plurality of the user equipments where each of the user equipments in the first group is assigned with a first spatial codeword vector, and transmitting the preferred precoder of the each of the user equipments in the first group and data for the each of the user equipments in the first group.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components.

FIG. 9 shows rank and layer order indication (RLOI) formats for 4-Tx MIMO.

FIG. 10 shows decreased layer order indication formats for 4-Tx MIMO.

FIG. 13 shows an example of a 4×4 HH matrix for multi-user MIMO transmission to four users.

DETAILED DESCRIPTION OF THE INVENTION

Figure 1:
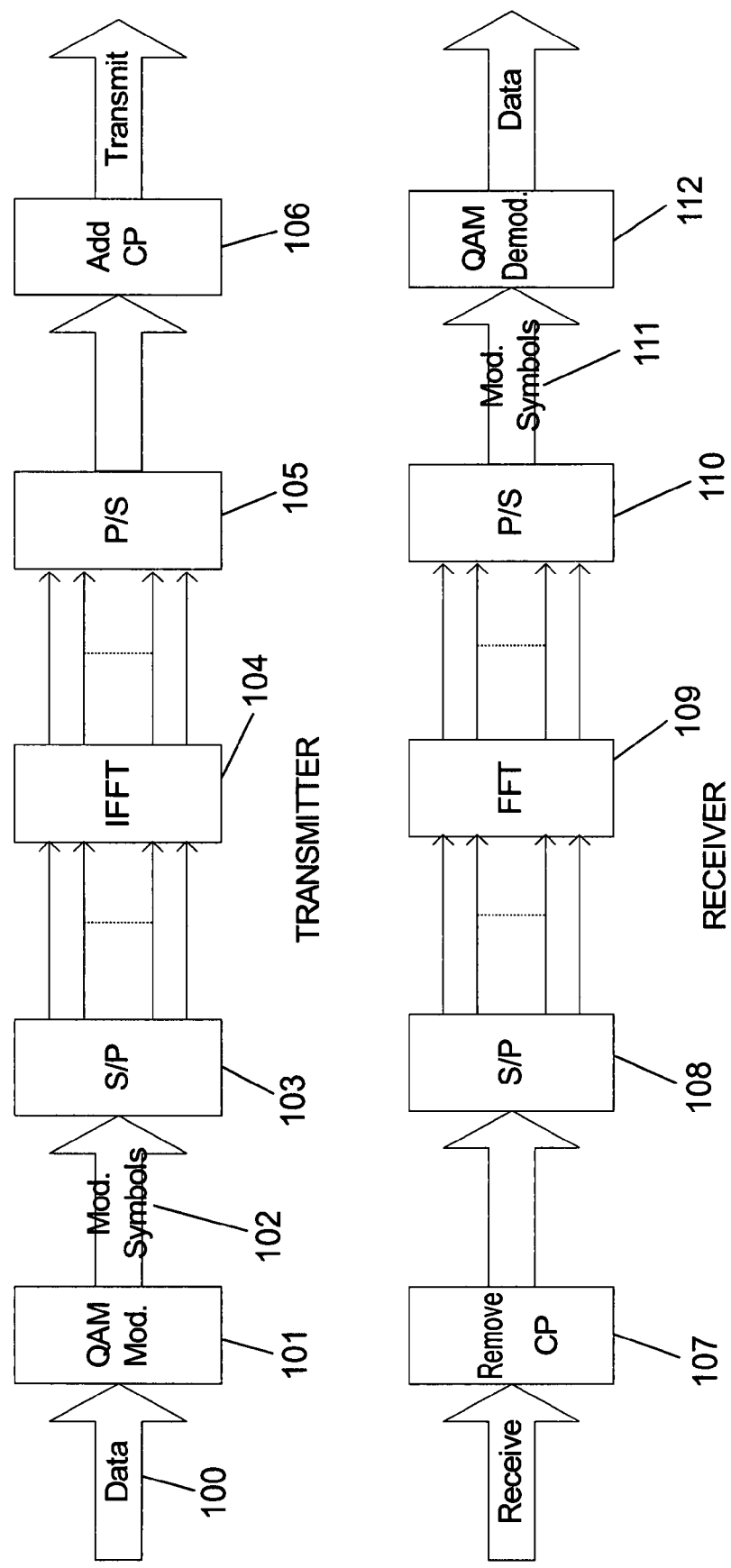
FIG. 1 illustrates diagrams of an example of user data transmission/reception using orthogonal frequency division multiplexing (OFDM).

A simplified example of data transmission/reception using orthogonal frequency division multiplexing (OFDM) is shown in FIG. 1. Data 100 is modulated by quadrature amplitude modulator 101, and the quadrature amplitude modulation (QAM) modulated symbols 102 are serial-to-parallel converted by serial-to-parallel converter 103. The converted data is input to inverse fast Fourier transform (IFFT) unit 104. At the output of IFFT unit 104, N time-domain samples are obtained. Here N refers to an inverse fast Fourier transform (IFFT) size or fast Fourier transform (FFT) size used in the OFDM system. The signal (N time-domain samples) output from IFFT unit 104 is parallel-to-serial converted by parallel-to-serial converter 105, and a cyclic prefix (CP) is added to the signal by cyclic prefix (CP) adding unit 106. The resulting sequence of samples is referred to as OFDM symbol. The OFDM symbol is transmitted to a receiver.

At the receiver, the cyclic prefix is first removed by cyclic removing unit 107, and the signal is serial-to-parallel converted by serial-to-parallel converter 108 before being fed into fast Fourier transform (FFT) unit 109. The output signal of FFT unit 109 is parallel-to-serial converted by parallel-to-serial converter 1110, and the resulting QAM modulation symbols 111 are input to QAM demodulator 112.

The total bandwidth in an OFDM system is divided into narrowband frequency units called subcarriers. The number of subcarriers is equal to the FFT/IFFT size N used in the system. In general, the number of subcarriers used for data is less than N because some subcarriers at the edge of the frequency spectrum are reserved as guard subcarriers. In general, no information is transmitted on guard subcarriers.

In a communication link, a multi-path channel results in a frequency-selective fading. Moreover, in a mobile wireless environment, the channel also results in a time-varying fading. Therefore, in a wireless mobile system employing OFDM based access, the overall system performance and efficiency can be improved by using, in addition to time-domain scheduling, frequency-selective multi-user scheduling. In a time-varying frequency-selective mobile wireless channel, it is also possible to improve the reliability of the channel by spreading and/or coding the information over the subcarriers.

Figure 2:
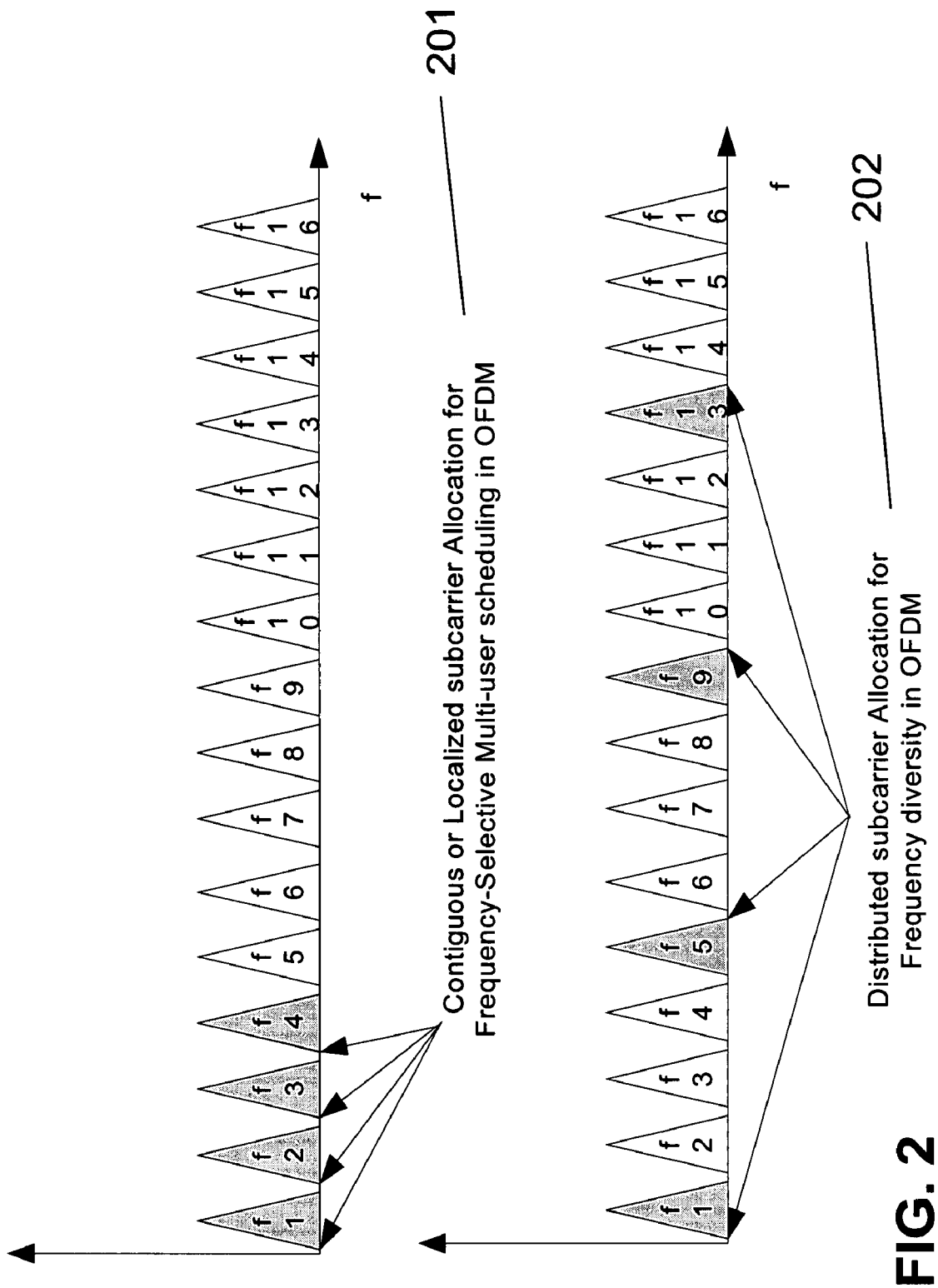
FIG. 2 shows subcarrier allocation for frequency-selective multi-user scheduling and frequency diversity in OFDM.

In case of frequency-selective multi-user scheduling, a contiguous set of subcarriers potentially experiencing an upfade is allocated for transmission to a user. The total bandwidth is divided into subbands grouping multiple contiguous subcarriers as shown in FIG. 2. In frequency-selective multi-user scheduling mode 201, subcarriers $f_1$, $f_2$, $f_3$ and $f_4$ are grouped into a subband. In case of frequency-diversity transmission mode 202, the allocated subcarriers are uniformly distributed over the whole spectrum as shown in FIG. 2. The frequency-selective multi-user scheduling mode is generally beneficial for low mobility users for which the channel quality can be tracked. The channel quality, however, can generally not be tracked for high mobility users (particularly in a frequency-division-duplex system where the fading between the downlink and uplink is independent) due to channel quality feedback delays, and hence the frequency diversity transmission mode is preferred for high mobility users.

Multiple input multiple output (MIMO) schemes use multiple transmit antennas and multiple receive antennas to improve the capacity and reliability of a wireless communication channel. A MIMO system promises linear increase in capacity with K, where K is a minimum of numbers of transmit (M) and receive antennas (N). The MIMO channel estimation consists of estimating the channel gain and phase information for links from each of the transmit antennas to each of the receive antennas. Therefore, the channel for M×N MIMO system consists of an N×M matrix:

$$H = \begin{bmatrix} a_{11} & a_{12} & \cdots & a_{1M} \\ a_{21} & a_{22} & \cdots & a_{2M} \\ \vdots & \vdots & \cdots & \vdots \\ a_{N1} & a_{M2} & \cdots & a_{NM} \end{bmatrix} \tag{1}$$

where $a_{ij}$ represents the channel gain from transmit antenna j to receive antenna i. In order to enable the estimations of the elements of the MIMO channel matrix, separate pilots are transmitted from each of the transmit antennas.

Figure 3:
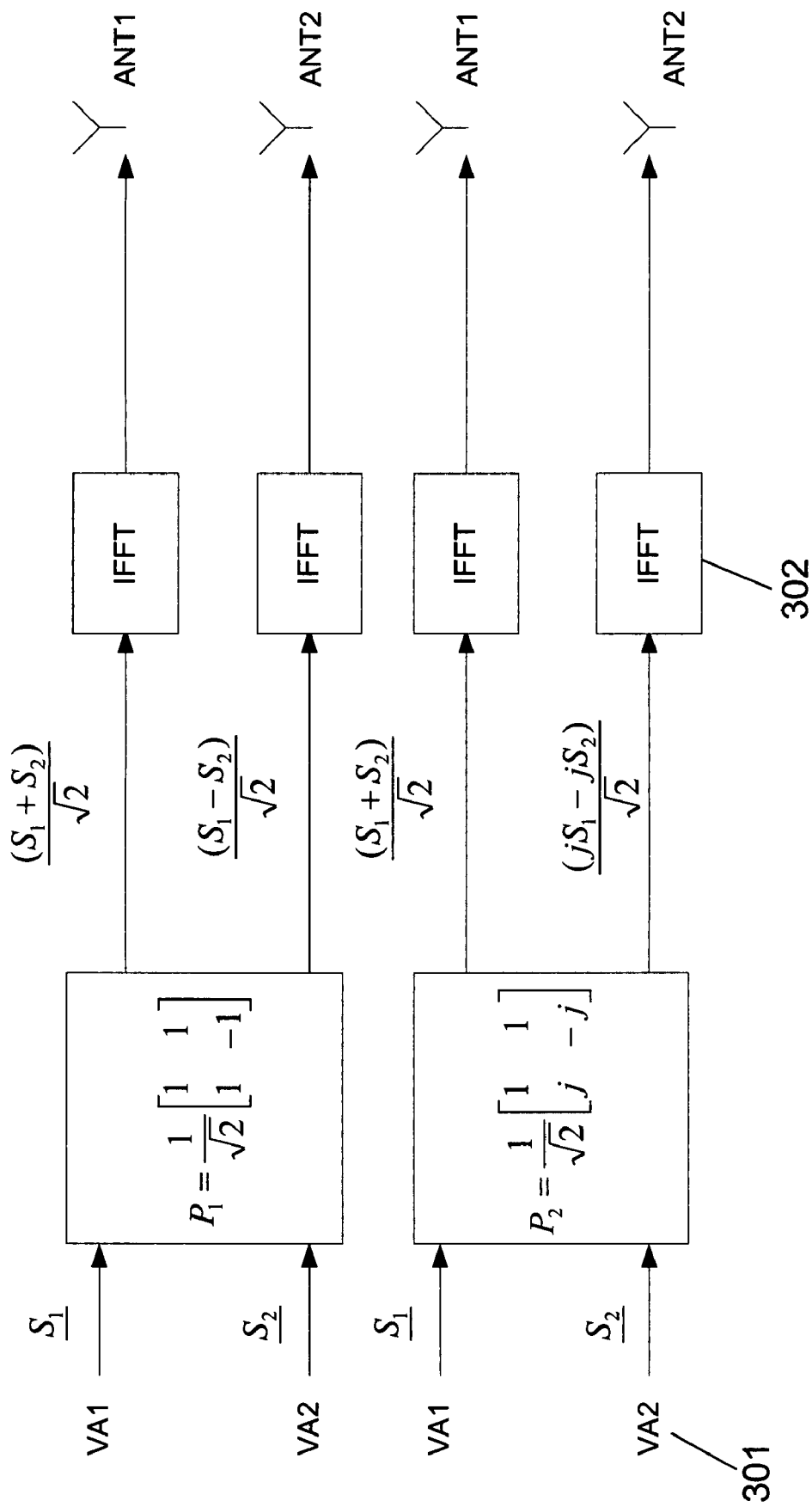
FIG. 3 shows an example of pre-coding in a multiple input multiple output (MIMO) system.

An optional pre-coding employs a unitary pre-coding before mapping the data streams to physical antennas as shown in FIG. 3. This creates a set of virtual antennas (VA) 301 or MIMO layers before the precoding. In this case, each of the codewords is potentially transmitted from all the physical transmit antennas. Two examples of unitary precoding matrices, $P_1$ and $P_2$ for the case of two transmit antenna can be:

$$P_1 = \frac{1}{\sqrt{2}} \begin{bmatrix} 1 & 1 \\ 1 & -1 \end{bmatrix}, P_2 = \frac{1}{\sqrt{2}} \begin{bmatrix} 1 & 1 \\ j & -j \end{bmatrix} \tag{2}$$

Assuming that modulation symbols $S_1$ and $S_2$ are transmitted at a given time from virtual antenna VA1 and virtual antenna VA2, respectively, the modulation symbols S1 and S2 after precoding with matrix $P_1$ and $P_2$ can be written as:

$$T_1 = P_1 \begin{bmatrix} S_1 \\ S_2 \end{bmatrix} = \frac{1}{\sqrt{2}} \begin{bmatrix} 1 & 1 \\ 1 & -1 \end{bmatrix} \times \begin{bmatrix} S_1 \\ S_2 \end{bmatrix} = \frac{1}{\sqrt{2}} \begin{bmatrix} S_1 + S_2 \\ S_1 - S_2 \end{bmatrix} \tag{3}$$

$$T_2 = P_2 \begin{bmatrix} S_1 \\ S_2 \end{bmatrix} = \frac{1}{\sqrt{2}} \begin{bmatrix} 1 & 1 \\ j & -j \end{bmatrix} \times \begin{bmatrix} S_1 \\ S_2 \end{bmatrix} = \frac{1}{\sqrt{2}} \begin{bmatrix} S_1 + S_2 \\ jS_1 - jS_2 \end{bmatrix}$$

Therefore, the symbols $$T_{11} = \frac{(S_1 + S_2)}{\sqrt{2}} \text{ and } T_{12} = \frac{(S_1 - S_2)}{\sqrt{2}}$$

are respectively transmitted from antenna ANT1 and antenna ANT2 when precoding is done using precoding matrix $P_1$. Similarly, the symbols $$T_{21} = \frac{(S_1 + S_2)}{\sqrt{2}} \text{ and } T_{22} = \frac{(jS_1 - jS_2)}{\sqrt{2}}$$

are respectively transmitted from antenna ANT1 and antenna ANT2 when preceding is done using preceding matrix $P_2$ as shown in FIG. 3. It should be noted that precoding is done on an OFDM subcarrier level before IFFT operations are performed by IFFT unit 302 as illustrated in FIG. 3.

A Fourier matrix-based precoding provides a simple framework for preceding in MIMO systems. A Fourier matrix is a N×N square matrix with entries given by:

$$P_{mn} = e^{j2\pi mn/N} \; m,n=0,1,\ldots(N-1) \tag{4}$$

A 2×2 Fourier matrix can be expressed as:

$$P_2 = \frac{1}{\sqrt{2}} \begin{bmatrix} 1 & 1 \\ 1 & e^{j\pi} \end{bmatrix} = \frac{1}{\sqrt{2}} \begin{bmatrix} 1 & 1 \\ 1 & -1 \end{bmatrix} \tag{5}$$

Similarly, a 4×4 Fourier matrix can be expressed as:

$$P_4 = \frac{1}{\sqrt{4}} \begin{bmatrix} 1 & 1 & 1 & 1 \\ 1 & e^{j\pi/2} & e^{j\pi} & e^{j3\pi/2} \\ 1 & e^{j\pi} & e^{j2\pi} & e^{j3\pi} \\ 1 & e^{j3\pi/2} & e^{j3\pi} & e^{j9\pi/2} \end{bmatrix} \tag{6}$$

$$= \frac{1}{\sqrt{4}} \begin{bmatrix} 1 & 1 & 1 & 1 \\ 1 & j & -1 & -j \\ 1 & -1 & 1 & -1 \\ 1 & -j & -1 & j \end{bmatrix}$$

Multiple precoder matrices can be defined by introducing a shift parameter (g/G) in the Fourier matrix as given by:

$$P_{mn} = e^{j2\pi m\left(n+\frac{g}{G}\right)} \; m,n = 0, 1, \ldots (N-1) \tag{7}$$

A set of four 2×2 Fourier matrices can be defined by taking G=4. These four 2×2 matrices with g=0, 1, 2 and 3 are written as:

$$P_2^0 = \frac{1}{\sqrt{2}} \begin{bmatrix} 1 & 1 \\ 1 & -1 \end{bmatrix} \tag{8}$$

$$P_2^1 = \frac{1}{\sqrt{2}} \begin{bmatrix} 1 & 1 \\ e^{j\pi/4} & -e^{j\pi/4} \end{bmatrix}$$

$$P_2^2 = \frac{1}{\sqrt{2}} \begin{bmatrix} 1 & 1 \\ e^{j\pi/2} & e^{j3\pi/4} \end{bmatrix}$$

$$P_2^3 = \frac{1}{\sqrt{2}} \begin{bmatrix} 1 & 1 \\ e^{j\pi/2} & -e^{j3\pi/4} \end{bmatrix}$$

It is well known that even when a system can support 4×4 MIMO, rank-4 (4 MIMO layers) transmissions are not always desirable. The MIMO channel experienced by user equipment (UE) generally limits the maximum rank that can be used for transmission. In general for weak users in the system, a lower rank transmission is preferred over a high rank transmission from throughput perspective. It is also possible that only a small fraction of UEs in the system are equipped with 4-Rx antennas. Therefore, system should support a variable numbers of MIMO layers transmissions to the same user and to different users in the system. Another important aspect in MIMO design is the amount of feedback overhead required. In an OFDM MIMO system, multiple channel quality indicators (CQIs) are potentially required even for single-layer transmission to exploit frequency-selective multi-user scheduling gains. The introduction of multiple MIMO layers is then expected to further increase the feedback overhead. Therefore, it is important to minimize the UE feedback overhead required to support multi-layer transmission. In case of a single user multiple input and multiple output (SU-MIMO) spatial multiplexing, the same subband is allocated to a given user from each of the transmit antennas or transmit beams.

Figure 4:
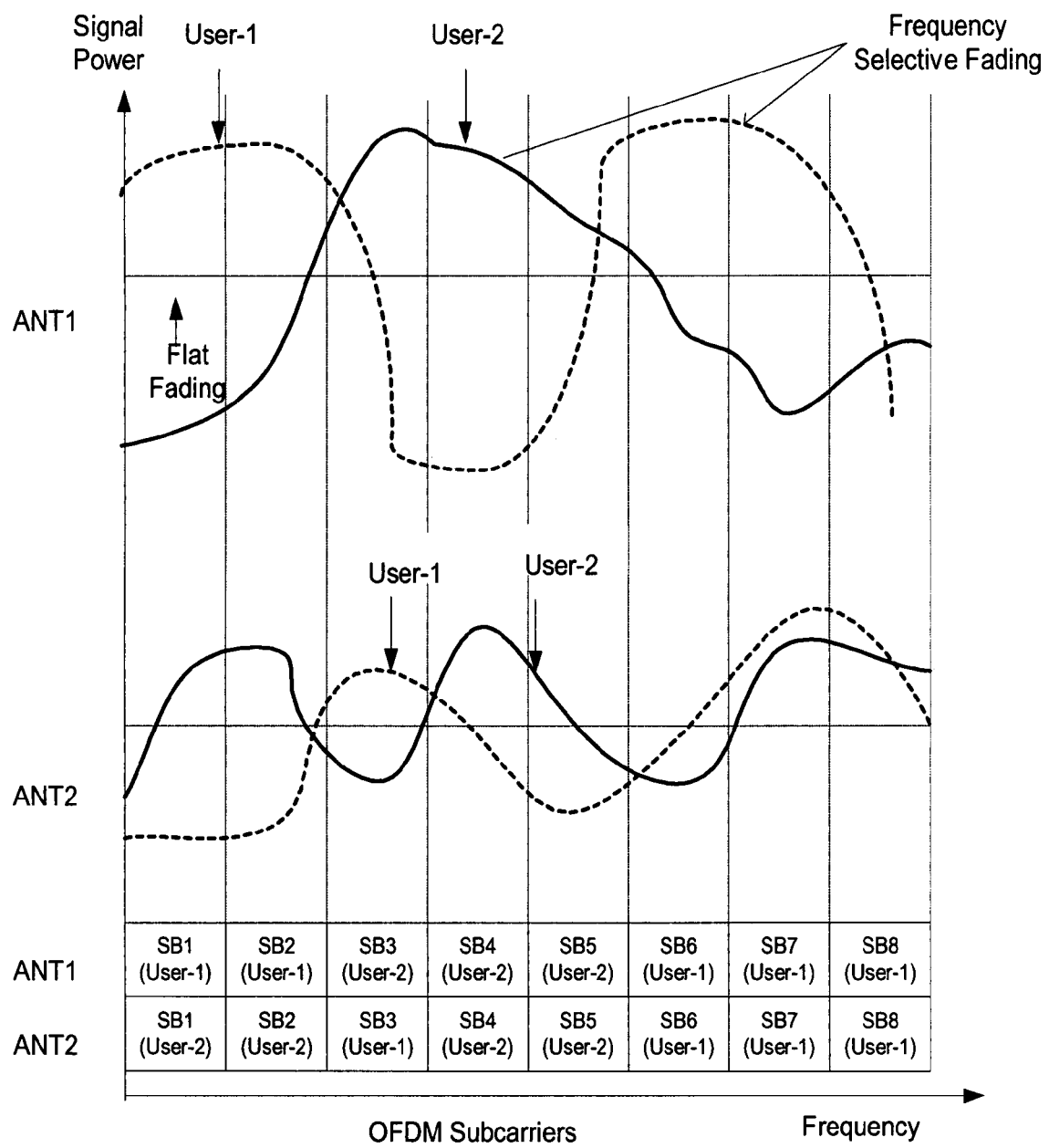
FIG. 4 illustrates an example of frequency selective fading in multi-user MIMO approach.

In case of a multi-user MIMO (MU-MIMO) approach, different spatially multiplexed users can share the same subband. An example of resource allocation for the case of two transmit antennas and two users for MU-MIMO is shown in FIG. 4. The received signals at User-1 and User-2 receivers from each of the two transmit antennas experience frequency-selective fading due to multipath channel. In case of uncorrelated antennas, the channel quality from each of the two transmit antennas at a given receiver is independent. Also, the channel from a given transmitter to each of the two users is also independent due to different locations of the users within a cell. Therefore, the two users experience independent fading from each of the two transmit antennas as shown in FIG. 4. A user is scheduled for transmission on a given subband on a given antenna if its channel quality on this subband on this antenna is better than all the other users in the cell. It is also possible to take other quality of service (QoS) criteria into account when selecting a user for transmission.

Figure 5:
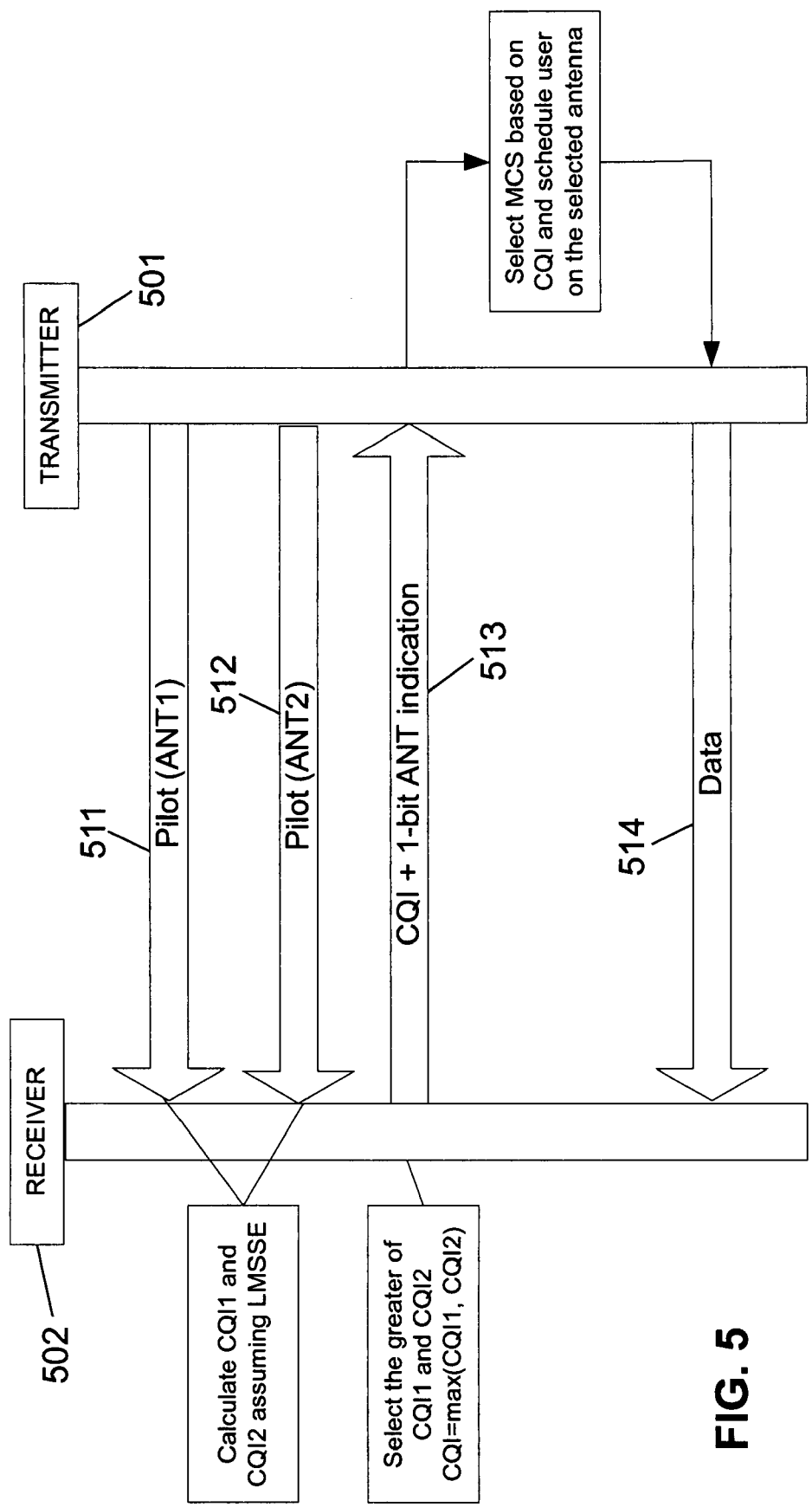
FIG. 5 illustrates diagrams of CQI feedback and scheduling for a multi-user MIMO scenario.

An example of CQI feedback and scheduling for a multi-user 2×2 MIMO scenario according to the teachings of the present invention is shown in FIG. 5. Transmitter 501 of a base station transmits pilot signals 511 and 512 from antennas ANT1 and ATN2 to receiver 502 of a user. Receiver 502 receives pilot signals 511 and 512, and calculates the CQIs of pilot signals 511 and 512 (CQI1 and CQI2, respectively) using linear minimum mean square error (LMMSE) operation, and transmits feedback signal 513 that includes the best CQI value between the two antennas (or streams) along with the antenna (stream) identification. The base station can then schedule data 514 for this user on the selected antenna using a modulation and coding (MCS) scheme that corresponds to the reported CQI. Similarly, another user that reports a better CQI on the other antenna can be selected for transmission, on the same time-frequency resource, on the other antenna (stream).

In the present invention, a method of operating a base station (also called Node-B) in a multi-user MIMO (MU-MIMO) configuration is provided. The detailed description of the operation presented in the present invention includes descriptions about a codebook that the UE will use to calculate CQI, a codebook that the base station will use to transmit the data, and the required signaling between the UE and the base station.

In the present invention, two modes of MU-MIMO are proposed. In the first mode, which is referred to as "subset codebook" mode, control signaling can be minimized. Typically a subset of a full codebook is used at both the UE and base station. Subset codebook mode is effective with large user loads and many UEs with multiple receive antennas, and therefore provides good interference suppression capabilities. In the second mode, which is referred to as. "full codebook" mode, a full codebook is used at both the UE and the base station. Full codebook mode is more effective with smaller user loads and many UEs with few or single receive antennas, and therefore provides very limited interference suppression capabilities. The construction of both the full codebook and the subset codebooks will be described later.

Figure 6:
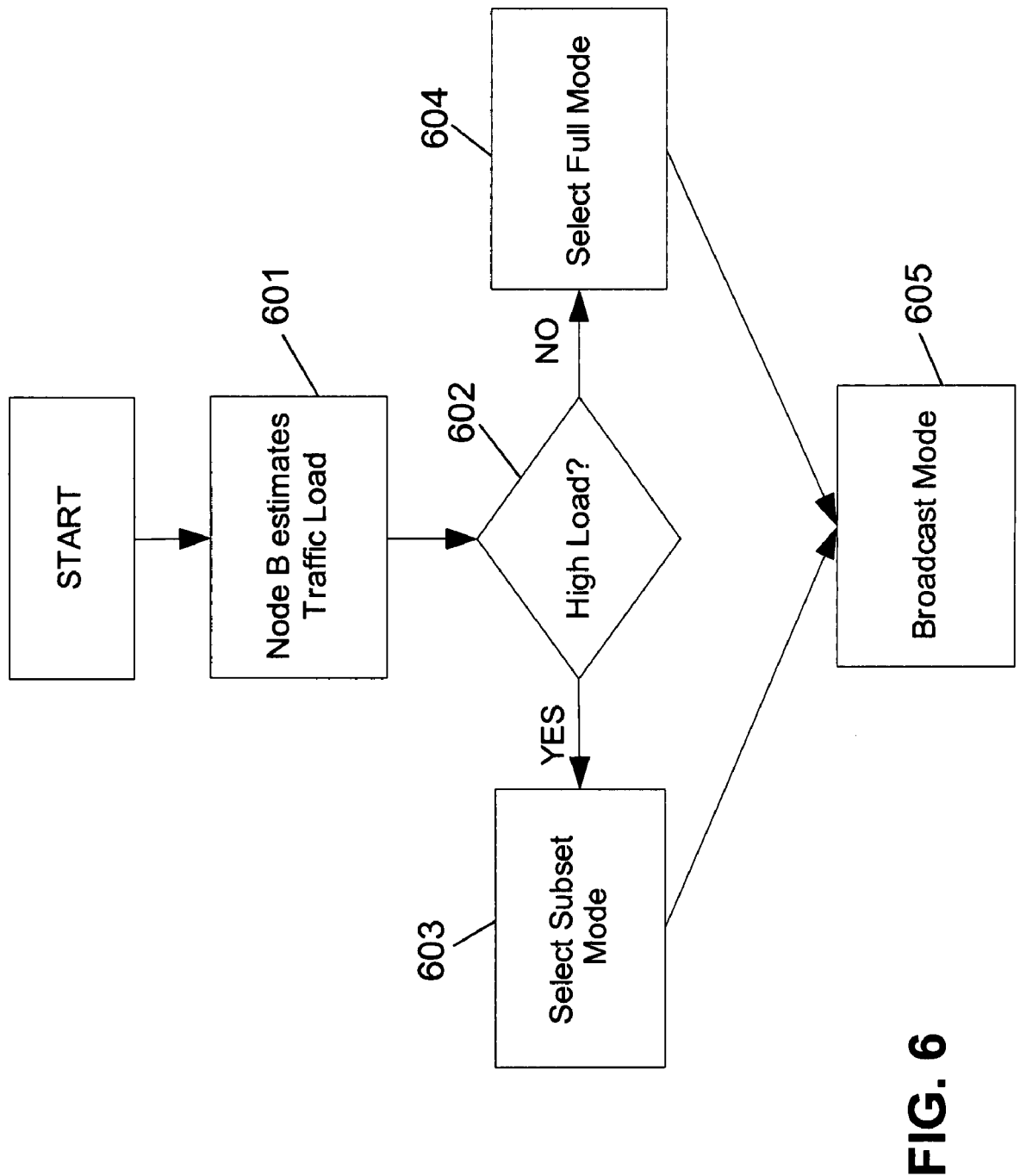
FIG. 6 illustrates steps for Node-B's mode selection and signaling based on the UE load.

Furthermore, in the present invention, the subset codebook mode and full codebook mode are semi-statically switched on a semi-static base. The semi-statically switching is referred to as a switching that happens slowly. In the practical application, the semi-statically switching can a switching that does not switch faster than every 10 seconds at most frequently. The control signals that accompany these changes are not part of the normal physical layer control signaling, this is sometimes referred to as higher layer signaling. It is expected that all UEs in a cell are in either the one mode or the other. The base station signals this semi-static switch on a common control channel to all the UEs in the cell. One example of this process is shown in FIG. 6. In step 601, the Node-B estimates traffic load. In step 602, the Node-B determines whether the traffic is high load. If the cell is heavily loaded, the Node-B selects the "subset codebook" mode (step 603). If the cell is lightly loaded, the Node-B selects the "full codebook" mode (step 604). Then, the Node-b broadcasts the selected mode (step 605). The Node-B can afford additional overhead to increase the throughput as shown in FIG. 6. A load can be regarded as high when for every scheduled resource element (a space-frequency-time slot) there are enough users reporting CQI and are available for scheduling on that element. So high load will be higher for a 4Tx antenna system compared to a 2Tx antenna system. For example, in a 2Tx antenna system, more than 8 active UE's per cell can be regarded as high load, and less than 8 active UEs per cell can be regarded as low load.

Figure 7:
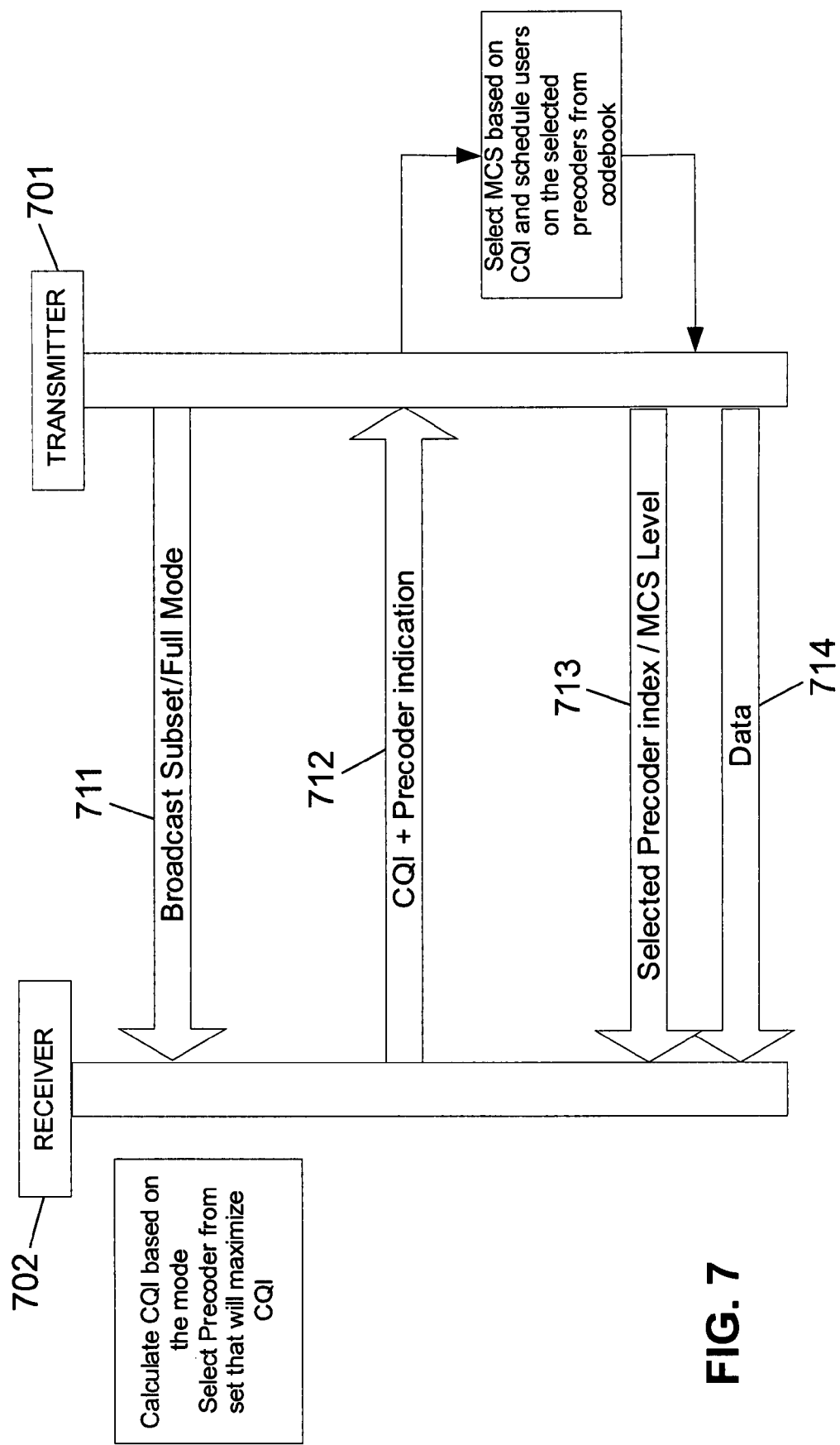
FIGS. 7 and 8 illustrate diagrams of CQI feedback and scheduling for a multi-user MIMO scenario.

The specific operations of the two modes are now described followed by common operations performed in both modes. The operations and signaling are shown in FIG. 7. As described referring to FIG. 6, one of "subset codebook" and "full codebook" mode is selected in the Node-B. Transmitter 701 transmits signals 711 according to the selected codebook mode. Receiver 702 receives signals 711 and calculates CQI based on the selected mode, and selects precoder that will maximize CQI. Receiver 702 transmits feed back signal 712 that includes the CQI calculated in receiver 702 and precoder indication. Transmitter 701 select a modulation and coding (MCS) scheme based on CQI and schedule UEs on the selected precoder from codebook. Transmitter 701, then, transmits signals 713, which includes the selected precoder index and MCS level, and data signal 714 to receiver 702.

Figure 8:
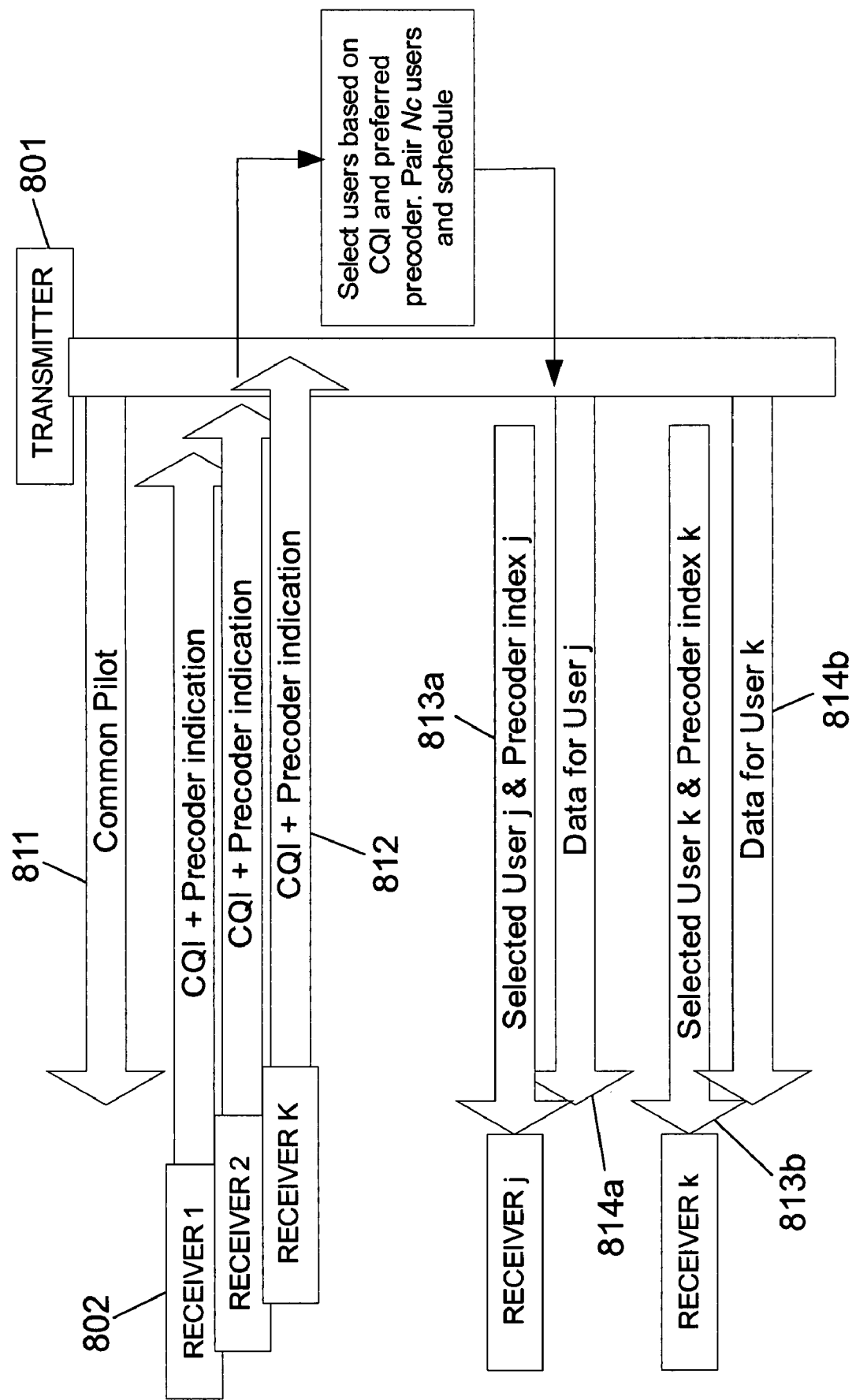

The operations, assuming multiple receivers, are shown in FIG. 8. As described referring to FIGS. 5 and 7, transmitter 801 transmits common pilot signals 811 to receivers 802 of users based on the selected codebook mode. Receiver 802 receives the signals 811, and each receiver (RECEIVER 1, RECEIVER 2, or RECEIVER k) calculates CQI based on the selected mode, and selects precoder that will maximize CQI. Each receiver transmits feed back signal 812 that includes the CQI and precoder indication. Transmitter 801 selects users based on CQI and the preferred precoder received from the users. Transmitter 801 transmits signal 813a, which includes precoder index j, to RECEIVER j of user j, and signals 813b, which includes precoder index k, to RECEIVER k of user k. Transmitter 801 also transmits data signal 814a for user j to RECEIVER j, and data signal 814b for user k to RECEIVER k.

When the "subset codebook" mode switch is on, the UE and Node-B performs the following operations.

First, the Node-B selects a subset codebook from the list of subset codebook, where the subset size is denoted by $N_c$. This choice of the subset codebook is semi-statically broadcast to all UEs in the cell, or periodically changed according to a predefined pattern. The size of the subset codebook is equal or less than the number of transmit antennas at base station, indicating full-rank (when the size of the codebook equals the number of transmit antenna) or non-full-rank choices at Node-B. The non-full-rank case is useful, for example, in a correlated antenna case where the Node-B detects that all UEs are located within a subset of spatial beams. Node-B broadcasts subset (or cycling pattern and parameters) to all UE's. The Node-B may choose to cycle through various combinations of subsets, or it may choose to remain with a fixed subset.

Second, the UE calculates CQI seen on each spatial codeword vector corresponding to the codewords in the subset codebook, assuming other vectors in the subset codebook as interference. The CQI can be calculated based on the parameters such as noise power, receiver combiner, and precoding vector index (PVI) selected by the UE. The UE transmits feedback signal including at least the largest CQI together with index of the largest CQI within the subset codebook. The UE may also report an additional CQI as described in FIG. 11, if the Node-B requires more information for greater scheduling flexibility.

Third, at a given time, the Node-B selects at most $N_c$ UEs, each of which is assigned with a spatial weight vector according to one of the codewords in the subset codebook.

Fourth, the Node-B may indicate in the downlink (DL) control channel the spatial weight vector for each UE selected for transmission by the Node-B which signals to each UE its code. (The UE implicitly knows the interfering codes). If the Node-B does not indicate the precoder index then the UE can assume that the scheduled precoder index is the same as the reported weight.

When the "Full codebook" mode switch is on, the following operations are applied to the UE and Node-B behaviors.

The UE calculates the CQI seen on each possible spatial codeword vectors corresponding to all the codewords in the codebook, assuming no intra-cellular interference. The UE feedback includes at least the largest CQI together with index of the largest CQI within the codebook.

One alternative of the operation of Node-B is that if there is only up to 2 UEs in the system, the Node-B can send in the DL control 4 bits to indicate the interfering user's choice in a 4Tx system (only 3 bits is needed in 2 Tx case).

Another alternative of the operation of Node-B is to use the 4 bits (4Tx case) to indicate the Node-B choice of transmission vector for this UE, after ZF/MMSE operation and vector quantization. The implication is that the task of residue interference suppression is left to the UE.

In both of the "subset codebook" and "full codebook" modes, the following operations are applied to the UE and Node-B behaviors.

First, the UE reports the preferred vector from the available codebook.

Second, the UE calculates and reports at least a single CQI based on prior knowledge of the current mode and the channel conditions. This means that in the subset codebook mode, the UE will assume, in the calculation of the CQI, the specific interference from the other codes in the codebook subset, while in the full codebook mode it may assume the average interference or no interference at all, depending on the specific implementation. In the "full codebook" mode, the UE may report the CQI in the format as described in FIG. 11 in order to offer greater scheduling flexibility.

Feedback reporting structure for subset codebook mode will be described as follows.

In one embodiment of the present invention, the feedback for each subband includes the information of PVI and CQI, where the PVI stands for a precoding vector index, and the PVI size is 1 bit for 2Tx and 2 bits for 4TX. The information of CQI includes at least the largest CQI but could include other CQIs. CQI is the channel quality indicator and one example of the CQI size is 5 bits.

In another embodiment of the present invention, the feedback for each subband includes the information of RLOI, CQI, and D-CQI, where the RLOI is the rank and layer index shown in Table 1 for 2Tx, and is shown in Table 2 and FIG. 9 for 4Tx. Furthermore, the size of RLOI is 2 bits for the 2Tx and 6 bits for 4Tx. CQI is the channel quality indicator assuming full-rank transmission at Node-B, and thus there are 1 interferer in the 2Tx case and 3 interferers in the 4Tx case. One example of the CQI size is 5 bits. D-CQI is the differences of CQIs as defined in FIG. 11. D-CQI is referred to as an index of channel quality indicator (CQI) gaps. D-CQI-k is the difference between the CQI on the first layer and the CQI on the k-th layer.

In another embodiment of the present invention, the feedback for each subband includes the information of LOI, CQI, and D-CQI. In addition, the rank is separately reported on a semi-static basis. In each subband, the LOI is the layer index and is obtained by removing the rank information from the RLOI. Furthermore, the size of LOI is 1 bit for the 2Tx and 5 bits for 4Tx.

In another embodiment of the present invention, the feedback for each subband includes the information of D-LOI, CQI, and D-CQI. In addition, Node-B can report the rank separately on a semi-static basis. In each subband, the D-LOI (a first order decreased layer index) is the decreased layer index and is obtained by first decreasing the number of combinations from RLOI as shown in FIG. 10 for 4Tx, and then by removing the rank information from the decreased RLOI. Furthermore, the size of D-LOI is 1 bit for the 2Tx and 4 bits for 4Tx. D-CQI is the delta CQI defined in FIG. 11 and can be of size 2 or 3 bits.

In another embodiment of the present invention, the feedback for each subband includes the information of D-LOI, CQI, D-CQI, and E-CQI. In addition, Node-B can report the rank separately on a semi-static basis. In each subband, the D-LOI is the decreased layer index and is obtained by first decreasing the number of combinations from RLOI as shown in FIG. 10 for 4Tx, and then by removing the rank information from the decreased RLOI. Furthermore, the size of D-LOI is 1 bit for the 2Tx and 4 bits for 4Tx. D-CQI is the differences of CQIs as defined in FIG. 11 and can be of size 2 or 3 bits. The E-CQI (an index of cumulative channel quality indicator gaps) is defined in FIG. 12 and can be of size 2 or 3 bits.

In another embodiment of the present invention, the feedback for each subband includes the information of DD-LOI, CQI, D-CQI, and E-CQI. The set of the decrease layer order is further reduced by removing the combinations associated with one particular antenna. This information is included in DD-LOI, which is referred to as a second order decreased layer index. This particular antenna is called "eliminated antenna," and the indication of the "eliminated antenna" can be signaled either semi-statically or can be once per subframe across all subbands. For example, if antenna 4 is viewed as less desirable, then we remove the layer and the order combinations (in rank 2,3,4) that include antenna 4. As a result, the remaining combinations are (1,2,x,x), (1,3,x,x), (2,3,x,x),(2,1,x,x),(3,1,x,x),(3,2,x,x). The DD-LOI therefore is 1 bit for 2Tx case and 3 bits for 4Tx case.

A UE supporting 2×2 MIMO spatial multiplexing can provide the rank, the layer order and CQI feedback as given in Table 1. A total of 2 bits feedback is provided for rank selection and layer order indication. It should be noted that rank selection and layer order indication information can be the same for all the subbands. A subband is defined as a set of resource blocks selected for CQI feedback purpose. A rank selection and layer order indication per subband can provide greater flexibility at the expense of additional feedback overhead. In Tables 1 and 2, Max-CQI means the largest CQI, and Delta-CQI means the differences of CQIs (D-CQI).

TABLE 1

UE Feedback for 2TX antenna MIMO

| | Number of possible Rank Layer order combinations | Information included in the feedback |
|---|---|---|
| Rank-1 | 2 | One Max-CQI |
| Rank-2 | 2 | One Max-CQI and Delta-CQI |

Feedback overhead for Rank and layer order indication (LOI) = 2 bits (2 + 2 = 4 combinations)
Maximum CQI Feedback overhead = 8 bits (5 bits Max-CQI + 3 bits Delta-CQI)

In another embodiment of the present invention, the rank information is separated from the ordering information, since the rank information typically changes slowly in time and frequency. Given that it may be useful to indicate only the ordering information separately from the rank. In this case we would require only 1 bit to indicate the full ordering information.

In addition to the subset codebook mentioned, a UE supporting 4×4 MIMO spatial multiplexing can provide the rank, the layer order, and CQI feedback as given in Table 2. A total of 6 bits feedback is provided for rank selection and layer order indication. It should be noted that rank selection and layer order indication information can be the same for all the subbands. A rank selection and layer order indication per subband can provide greater flexibility at the expense of additional feedback overhead. The CQI feedback is per frequency subband selected for CQI feedback purpose.

TABLE 2

UE Feedback for 4TX antenna MIMO

| | Rank Layer order indication (RLOI) | Information included in the feedback |
|---|---|---|
| Rank-1 | 4 | oneMax-CQI |
| Rank-2 | 12 | One Max-CQI and Delta-CQI |
| Rank-3 | 24 | One Max-CQI and Delta-CQI |
| Rank-4 | 24 | One Max-CQI and Delta-CQI |

Feedback overhead for Rank and antennas order indication = 6 bits (4 + 12 + 24 + 24 = 64 combinations)
Maximum CQI Feedback overhead per subband = 8 bits (5 bits Full CQI + 3 bits Delta CQI)

Given that Rank information typically changes slowly in time and frequency, it may be useful to indicate only the ordering information separately from the rank. Feedback overhead for antennas order indication is 5 bits and maximum 24 combinations (max(4,12,24,24)=24). In this case we would require only 5 bits to indicate the full ordering information as shown in FIG. 9.

FIG. 10 shows an alternative embodiment where we only indicate reduced/partial ordering information (only the best and $2^{nd}$ best layers) in which case we can reduce the feedback overhead to 4 bits. Here feedback overhead for layer order indication is 4 bits and maximum 12 combinations (max(4, 12,12,12)=12).

Figure 11:
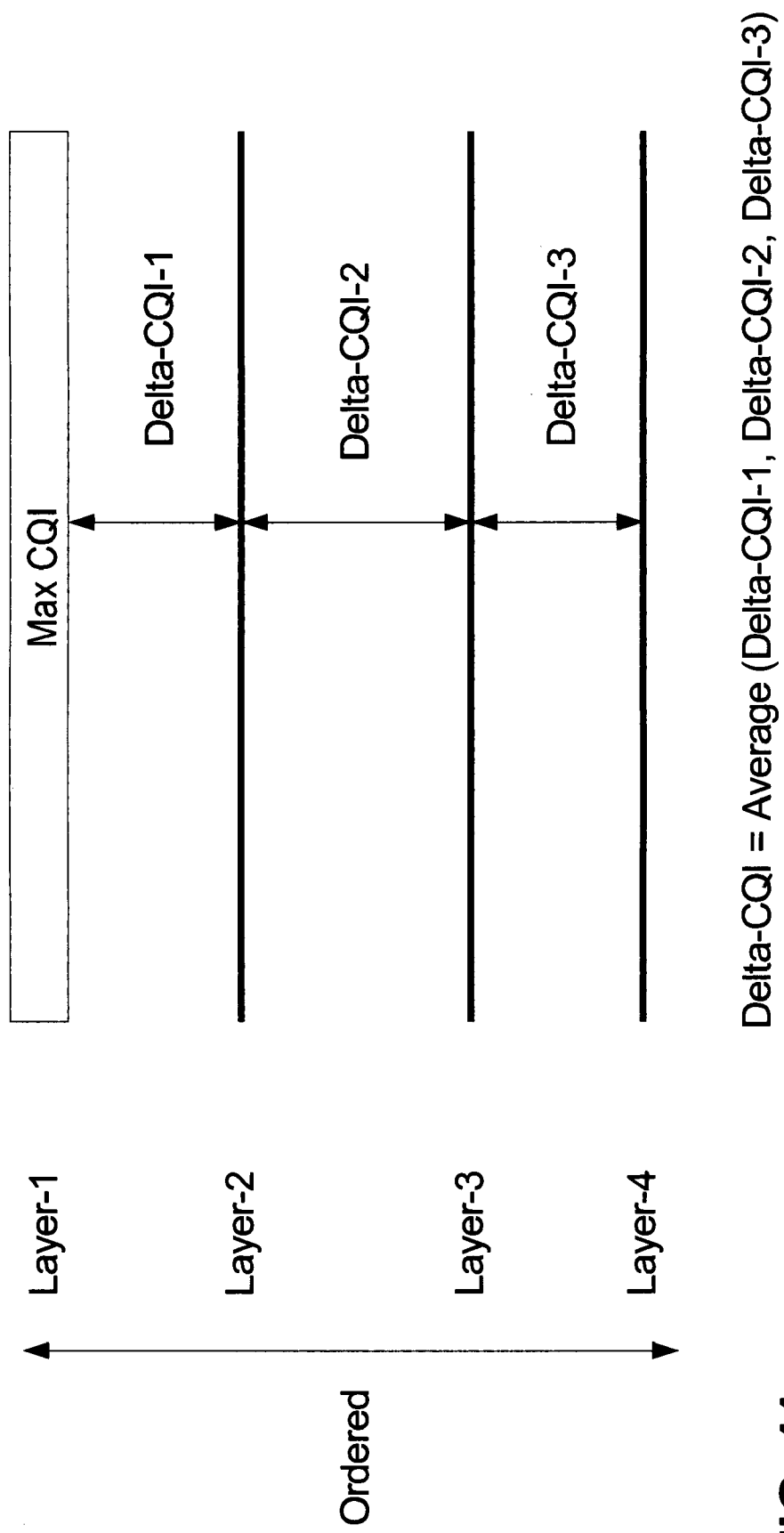
FIG. 11 illustrates an example of full and delta CQI for rank-4 transmission.

One feedback parameter, D-CQI, is defined to indicate the CQI difference between optimal and non-optimal layers, assuming that the Node-B is always transmitting at maximum rank allowed by the choice of subset codebook. The CQIs for the remaining layers are indicated by a "delta" difference relative to the maximum CQI as shown in FIG. 11. It is also possible to indicate an average delta CQI (averaged over the delta CQI's) which will results in a lower CQI feedback overhead. In case of rank-2 transmission, the delta CQI is a single delta value relative to the maximum CQI. This means that if the Node B would like to schedule a UE on its second best layer (instead of its best, as reported), it can do so and have a reasonable estimate of the CQI on this $2^{nd}$ layer. It also gives an indication to the Node-B how much rank overriding will affect the CQI.

Figure 12:
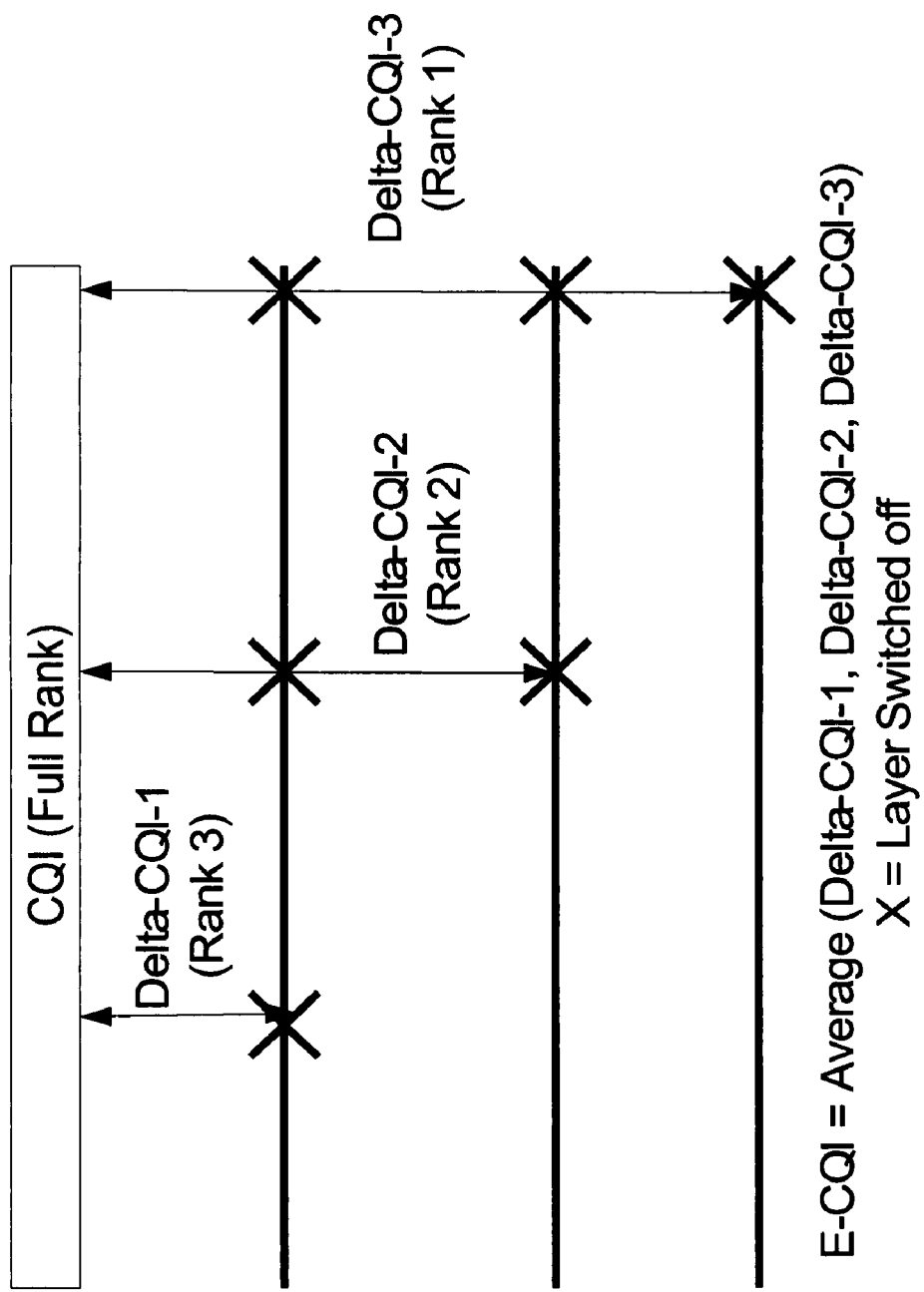
FIG. 12 illustrates an example of full and delta CQI for different rank transmission.

One feedback parameter, E-CQI, is defined to indicate the CQI difference if Node-B is not transmitting at maximum rank allowed by the choice of subset codebook. In the example of FIG. 12, the maximum rank is 4, and therefore there are three delta CQI terms (Delta-CQI-1, Delta-CQI-2, Delta-CQI-3), indicating the CQI gain when the transmission rank reduces by 1, 2 or 3. In addition, E-CQI is a function of these delta values, i.e., E-CQI=f(Delta-CQI-1, Delta-CQI-2, Delta-CQI-3). One example of the E-CQI is to let E-CQI=Delta-CQI-3 in FIG. 12. Another example is when E-CQI is a weighted average such that E-CQI=w1*Delta-CQI-1+w2*Delta-CQI-2+w3* Delta-CQI-3, where w=[w1, w2,w3] is a weight vector, and one example of w is w=⅓[1, 1,1] and another is w=⅓*[1,2,3].

Hereafter, examples of codebook for 2-Tx Multi-user (MU) MIMO and codebook for 4Tx multi-user MIMO will be specifically described.

First, for the codebook for 2Tx MU MIMO, the full codebook $C_F$ for the 2Tx MU MIMO case is a 3 bits codebook with 8 codewords, and each codeword is a 2×1 column vector. In one example of the codebook, the full codebook is a 3 bits codebook comprising the columns of the four 2×2 matrices that are generated by left-multiplying a 2×2 DFT matrix with diagonal linear phase-shift matrices. The four 2×2 matrices in this example are:

$$\begin{bmatrix} 1 & 1 \\ 1 & -1 \end{bmatrix}, \begin{bmatrix} 1 & 1 \\ j & -j \end{bmatrix}, \begin{bmatrix} 1 & 1 \\ (1+j)/\sqrt{2} & (1-j)/\sqrt{2} \end{bmatrix}, \quad (10)$$

$$\begin{bmatrix} 1 & 1 \\ (-1+j)/\sqrt{2} & (-1-j)/\sqrt{2} \end{bmatrix},$$

and the 3 bits full codebook $C_{F,1}$ consists of the set of the 8 vectors:

$$C_{F,1} = \left\{ \begin{array}{c} \begin{bmatrix} 1 \\ 1 \end{bmatrix}, \begin{bmatrix} 1 \\ -1 \end{bmatrix}, \begin{bmatrix} 1 \\ j \end{bmatrix}, \\ \begin{bmatrix} 1 \\ -j \end{bmatrix}, \begin{bmatrix} 1 \\ (1+j)/\sqrt{2} \end{bmatrix}, \\ \begin{bmatrix} 1 \\ (1-j)/\sqrt{2} \end{bmatrix}, \\ \begin{bmatrix} 1 \\ (-1+j)/\sqrt{2} \end{bmatrix}, \begin{bmatrix} 1 \\ (-1-j)/\sqrt{2} \end{bmatrix} \end{array} \right\} \quad (11)$$

In another example of the codebook, the full codebook is generated by applying household operation $$H(u) = I_2 - \frac{2}{\|u\|^2} u u^H$$

to four size 2×1 generating vectors, and then collecting all 8 column vectors from the resulting 4 matrices. The example of the four generating vectors are:

$$u_1 = \begin{bmatrix} 1 \\ 1 \end{bmatrix}; u_2 = \begin{bmatrix} 1 \\ j \end{bmatrix}, u_3 = \begin{bmatrix} 1 \\ (1+j)/\sqrt{2} \end{bmatrix}, \quad (12)$$

$$u_4 = \begin{bmatrix} 1 \\ (1+j)/\sqrt{2} \end{bmatrix}.$$

A subset codebook $C_S$ for the 2Tx case is a codebook that comprises 1 codeword or 2 codewords from the full codebook $C_F$, and the codewords in the subset codebook forms a subset of the full codebook $C_F$, or $C_S \subset C_F$. For the example full codebook $C_{F,1}$ above, we provide several examples of the subset codebook. First, we show four subset codebooks that include two codewords:

$$\left\{ \begin{bmatrix} 1 \\ 1 \end{bmatrix}, \begin{bmatrix} 1 \\ -1 \end{bmatrix} \right\}, \left\{ \begin{bmatrix} 1 \\ j \end{bmatrix}, \begin{bmatrix} 1 \\ -j \end{bmatrix} \right\}, \left\{ \begin{bmatrix} 1 \\ (1+j)/\sqrt{2} \end{bmatrix}, \begin{bmatrix} 1 \\ (1-j)/\sqrt{2} \end{bmatrix} \right\}, \quad (13)$$

$$\left\{ \begin{bmatrix} 1 \\ (-1+j)/\sqrt{2} \end{bmatrix}, \begin{bmatrix} 1 \\ (-1-j)/\sqrt{2} \end{bmatrix} \right\},$$

and then show 2 subset codebooks that include one codeword:

$$\left\{ \begin{bmatrix} 1 \\ 1 \end{bmatrix} \right\}, \left\{ \begin{bmatrix} 1 \\ -1 \end{bmatrix} \right\}. \quad (14)$$

The above discussion for the 2Tx codebooks are summarized in Table 3. This codebook is believed to provide a reasonable trade-off between size and performance while at the same time addressing several important scenarios including correlated and uncorrelated fading setups.

TABLE 3

Codebook for 2-Tx antennas MU-MIMO

| | Codebook | Codebook Size |
|---|---|---|
| Full codebook | $\begin{bmatrix} 1 \\ 1 \end{bmatrix}, \begin{bmatrix} 1 \\ -1 \end{bmatrix}, \begin{bmatrix} 1 \\ j \end{bmatrix}, \begin{bmatrix} 1 \\ -j \end{bmatrix}, \begin{bmatrix} 1 \\ (1+j)/\sqrt{2} \end{bmatrix}, \begin{bmatrix} 1 \\ (1-j)/\sqrt{2} \end{bmatrix},$ $\begin{bmatrix} 1 \\ (-1+j)/\sqrt{2} \end{bmatrix}, \begin{bmatrix} 1 \\ (-1-j)/\sqrt{2} \end{bmatrix}$ | 8 |
| Examples of subset codebooks | $\left\{ \begin{bmatrix} 1 \\ 1 \end{bmatrix}, \begin{bmatrix} 1 \\ -1 \end{bmatrix} \right\}, \left\{ \begin{bmatrix} 1 \\ j \end{bmatrix}, \begin{bmatrix} 1 \\ -j \end{bmatrix} \right\},$ $\left\{ \begin{bmatrix} 1 \\ (1+j)/\sqrt{2} \end{bmatrix}, \begin{bmatrix} 1 \\ (1-j)/\sqrt{2} \end{bmatrix} \right\},$ $\left\{ \begin{bmatrix} 1 \\ (-1+j)/\sqrt{2} \end{bmatrix}, \begin{bmatrix} 1 \\ (-1-j)/\sqrt{2} \end{bmatrix} \right\}$ $\left\{ \begin{bmatrix} 1 \\ 1 \end{bmatrix} \right\}, \left\{ \begin{bmatrix} 1 \\ -1 \end{bmatrix} \right\},$ | 2/1 |

(Note that more subset codebooks are possible)

Note that for notational brevity, a scaling factor normalizing each codebook element has been intentionally omitted from the table. This scaling factor ensures the total transmit power is constant regardless of which precoder element is applied.

Next, for the full codebook $C_F$ for the 4Tx MU-MIMO case is a 4 bits codebook with 16 codewords, and each codeword is a 4×1 column vector. In one example of the codebook, the full codebook is a 4 bits codebook comprising the columns of the four 4×4 DFT matrices that are generated by left-multiplying a 4×4 DFT matrix with diagonal linear phase-shift matrices. The four DFT matrices in this example are:

$$W_1 = 1/\sqrt{4} * DFT = 0.5 * \begin{bmatrix} 1 & 1 & 1 & 1 \\ 1 & j & -1 & -j \\ 1 & -1 & 1 & -1 \\ 1 & -j & -1 & j \end{bmatrix} \quad (15)$$

$$W_2 = diag(1, 1, 1, -1) * W_1 = 0.5 * \begin{bmatrix} 1 & 1 & 1 & 1 \\ 1 & j & -1 & -j \\ 1 & -1 & 1 & -1 \\ -1 & j & 1 & -j \end{bmatrix} \quad (16)$$

$$W_3 = diag(1, 1, j, j) * W_1 = 0.5 * \begin{bmatrix} 1 & 1 & 1 & 1 \\ 1 & j & -1 & -j \\ j & -j & j & -j \\ j & 1 & -j & -1 \end{bmatrix} \quad (17)$$

$$W_4 = diag(1, 1, -j, -j) * W_1 = 0.5 * \begin{bmatrix} 1 & 1 & 1 & 1 \\ 1 & j & -1 & -j \\ -j & j & -j & j \\ -j & -1 & j & 1 \end{bmatrix} \quad (18)$$

and the 4 bits full codebook $C_{F,1}$ consists of the set of the 16 vectors:

$$C_{F,1} = \left\{ \begin{bmatrix} 1 \\ 1 \\ 1 \\ 1 \end{bmatrix}, \begin{bmatrix} 1 \\ j \\ -1 \\ -j \end{bmatrix}, \begin{bmatrix} 1 \\ -1 \\ 1 \\ -1 \end{bmatrix}, \begin{bmatrix} 1 \\ -j \\ -1 \\ j \end{bmatrix}, \begin{bmatrix} 1 \\ 1 \\ 1 \\ -1 \end{bmatrix}, \begin{bmatrix} 1 \\ j \\ -1 \\ j \end{bmatrix}, \begin{bmatrix} 1 \\ -1 \\ 1 \\ 1 \end{bmatrix}, \right. \\ \begin{bmatrix} 1 \\ -j \\ -1 \\ -j \end{bmatrix}, \begin{bmatrix} 1 \\ 1 \\ j \\ j \end{bmatrix}, \begin{bmatrix} 1 \\ j \\ -j \\ j \end{bmatrix}, \begin{bmatrix} 1 \\ -1 \\ j \\ 1 \end{bmatrix}, \begin{bmatrix} 1 \\ -j \\ j \\ -j \end{bmatrix}, \begin{bmatrix} 1 \\ 1 \\ -j \\ -j \end{bmatrix}, \\ \left. \begin{bmatrix} 1 \\ j \\ j \\ -1 \end{bmatrix}, \begin{bmatrix} 1 \\ -1 \\ -j \\ j \end{bmatrix}, \begin{bmatrix} 1 \\ -j \\ j \\ 1 \end{bmatrix} \right\} \quad (19)$$

In another example of the codebook, the full codebook is generated by applying household operation $$H(u) = I_4 - \frac{2}{\|u\|^2} u u^H$$

to four size 4×1 generating vectors, and then collecting all 16 column vectors from the resulting 4 matrices. The example of the four generating vectors are:

$$u_1 = \begin{bmatrix} 1 \\ j \\ -1 \\ -j \end{bmatrix}; u_2 = \begin{bmatrix} 1 \\ j \\ -1 \\ j \end{bmatrix}, u_3 = \begin{bmatrix} 1 \\ j \\ -j \\ 1 \end{bmatrix}, u_4 = \begin{bmatrix} 1 \\ j \\ j \\ -1 \end{bmatrix}. \quad (20)$$

An example of a HH matrix assuming generating vector $u_1$ is given below:

$$H(u_1) = I_4 - \frac{2}{\|u_1\|^2} u_1 u_1^H = \frac{1}{\sqrt{4}} \begin{bmatrix} 1 & j & 1 & -j \\ -j & 1 & j & 1 \\ 1 & -j & 1 & j \\ j & 1 & -j & 1 \end{bmatrix} \quad (21)$$

A codebook consisting of a single or multiple HH matrices can be constructed and used for multi-user MIMO communications. The UEs provide CQI and precoding feedback on a per subband basis. An example of Multi-user MIMO transmission to 4 UEs using a 4×4 HH matrix $H(u_1)$ is shown in FIG. 13. In this example, User-C, User-A, User-D, and User-B are respectively scheduled using first, second, third and the fourth column precoder from the 4×4 HH matrix H $(u_1)$ in subband 1. In the subband 2, User-D, User-C, User-A, and User-B are respectively scheduled using first, second, third and the fourth column precoder from the 4×4 HH matrix H $(u_1)$. The UEs can provide feedback regarding their preferred column vector from the 4×4 HH matrix $H(u_1)$ with associated CQI. The UEs can also provide ordering of the column selection from the 4×4 HH matrix H $(u_1)$.

Figure 14:
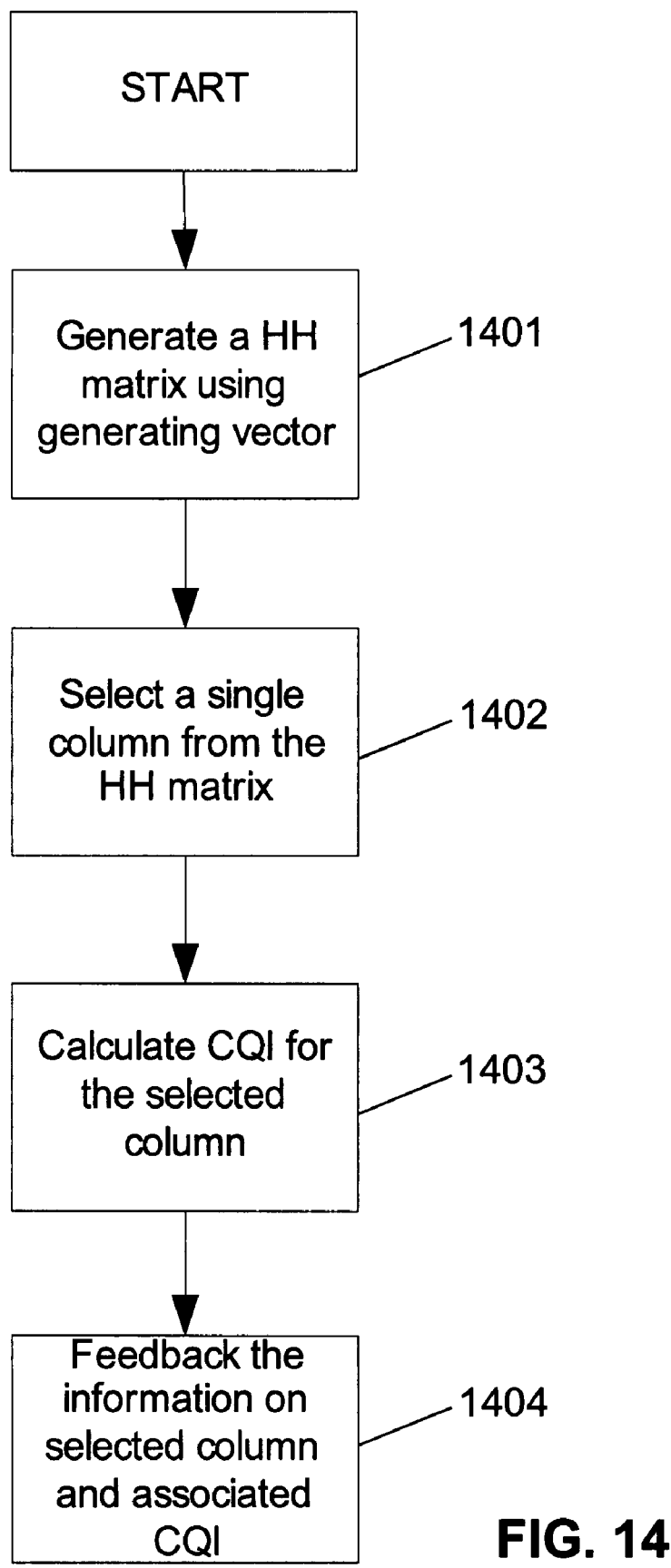
FIG. 14 illustrates steps for UE feedback for column selection from a HH matrix for multi-user MIMO communications.

An example of UE feedback for column selection from a HH matrix for a multi-user MIMO communication is shown in the flow chart of FIG. 14. Referring to FIG. 14, an HH matrix is generated by using a generating vector (step 1401), and a single column is selected for a UE from the HH matrix (step 1402). The UE calculated CQI for the selected column of the HH matrix (step 1403), and the UE transmits feedback signals including information on the selected column and associated CQI (step 1404).

Figure 15:
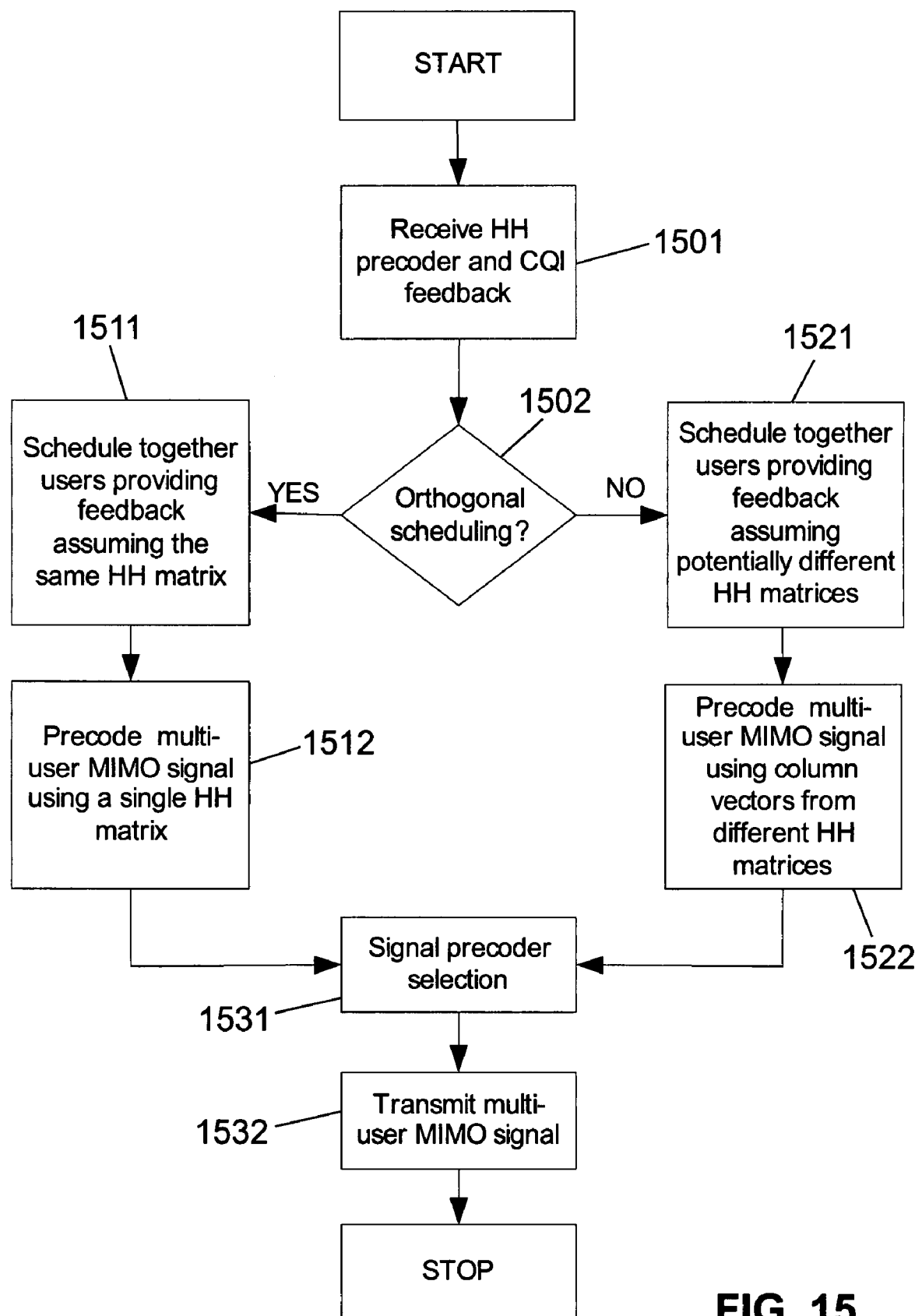
FIG. 15 illustrates steps for Node-B scheduling for a multi-user MIMO communication using HH codebook.

An example of Node-B scheduling for a multi-user MIMO communications using HH codebook is shown in the flow chart of FIG. 15. Referring to FIG. 15, Node-B receives HH precoder and CQI feedback from UEs (step 1501), and determines whether orthogonal scheduling is necessary (step 1502). Herein, orthogonal scheduling is scheduling users on orthogonal precoding vectors and non-orthogonal scheduling is scheduling users on non-orthogonal preceding vectors. In the case of orthogonal scheduling, Node-B schedules together users providing feedback assuming the same HH matrix (step 1511), and precodes multi-user MIMO signal using a single HH matrix (step 1512). In the case of non-orthogonal scheduling, Node-B schedules together users providing feedback assuming potentially different HH matrices (step 1521), and precodes multi-user MIMO signal using column vectors from different HH matrices (step 1522). After these processes, the Node-B selects a precoder signal (step 1531), and transmits multi-user MIMO signal to users (step 1532).

A subset codebook $C_S$ for the 4Tx case is a codebook that comprises between 1 codeword and 4 codewords from the full codebook $C_F$, and the codewords in the subset codebook forms a subset of the full codebook $C_F$, or $C_S \subset C_F$. For the example full codebook $C_{F,1}$ above, there could be several examples of the subset codebook. First, four subset codebooks that include four codewords can be represented as:

$$\left\{ \begin{bmatrix} 1 & 1 & 1 & 1 \\ 1 & j & -1 & -j \\ 1 & -1 & 1 & -1 \\ 1 & -j & -1 & j \end{bmatrix} \right\}, \left\{ \begin{bmatrix} 1 & 1 & 1 & 1 \\ 1 & j & -1 & -j \\ 1 & -1 & 1 & -1 \\ -1 & j & 1 & -j \end{bmatrix} \right\}, \quad (22)$$

-continued $$\left\{\begin{bmatrix} 1 & 1 & 1 & 1 \\ 1 & j & -1 & -j \\ j & -j & j & -j \\ j & 1 & -j & -1 \end{bmatrix}\right\}, \left\{\begin{bmatrix} 1 & 1 & 1 & 1 \\ 1 & j & -1 & -j \\ -j & j & -j & j \\ -j & -1 & j & 1 \end{bmatrix}\right\}$$

Two subset codebooks that include two codeword can be shown as:

$$\left\{\begin{bmatrix} 1 & 1 \\ 1 & j \\ 1 & -1 \\ 1 & -j \end{bmatrix}\right\}, \left\{\begin{bmatrix} 1 & 1 \\ -1 & -j \\ 1 & -1 \\ -1 & j \end{bmatrix}\right\}. \quad (23)$$

The codebook for 4Tx is summarized in Table 4. The codebook is believed to provide a reasonable trade-off between size and performance while at the same time addressing several important scenarios including correlated and uncorrelated fading setups.

Figure 16:
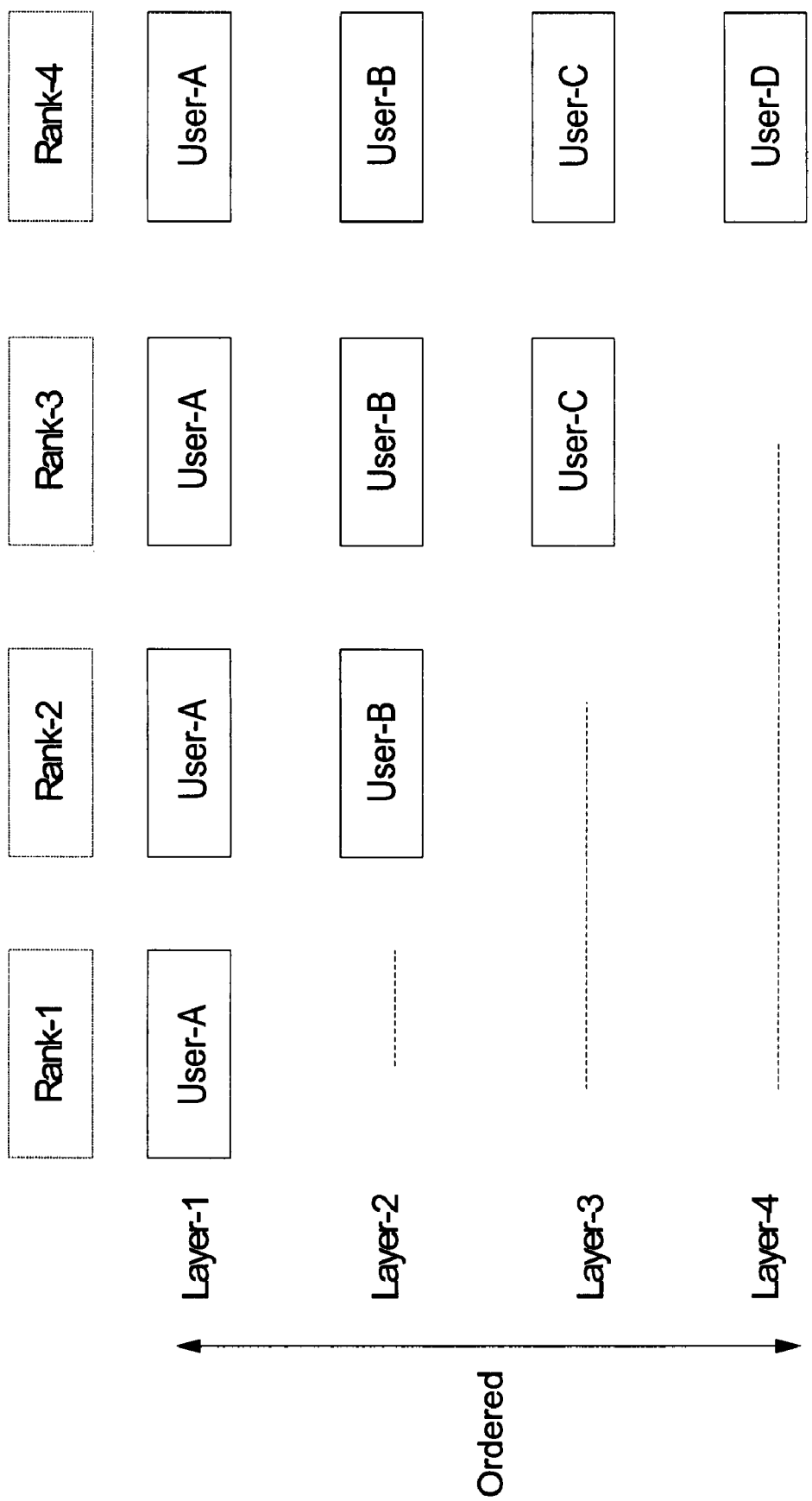
FIGS. 16 and 17 illustrate examples of multi-user MIMO for up to rank-4 transmission.

MIMO mode. In case of single-user MIMO, two best reported layers (Rank-2) are used for transmission with the first layer MCS selected based on the Max-CQI and the second layer MCS selected based on the Max-CQI+Delta-CQI feedback. In case of multi-user MIMO, the Node-B can schedule this UE on the best-reported layer and another UE on a second layer. In case of more than one UE reports the same first layer preference, Node-B can schedule a UE on the second best layer (or even third and fourth for Rank-4). A possible case for multi-user MIMO operation is shown in FIG. 16. In this case, a single user, two users, three users and four users are scheduled under Rank-1, Rank-2, Rank-3, and Rank-4 respectively.

Figure 17:
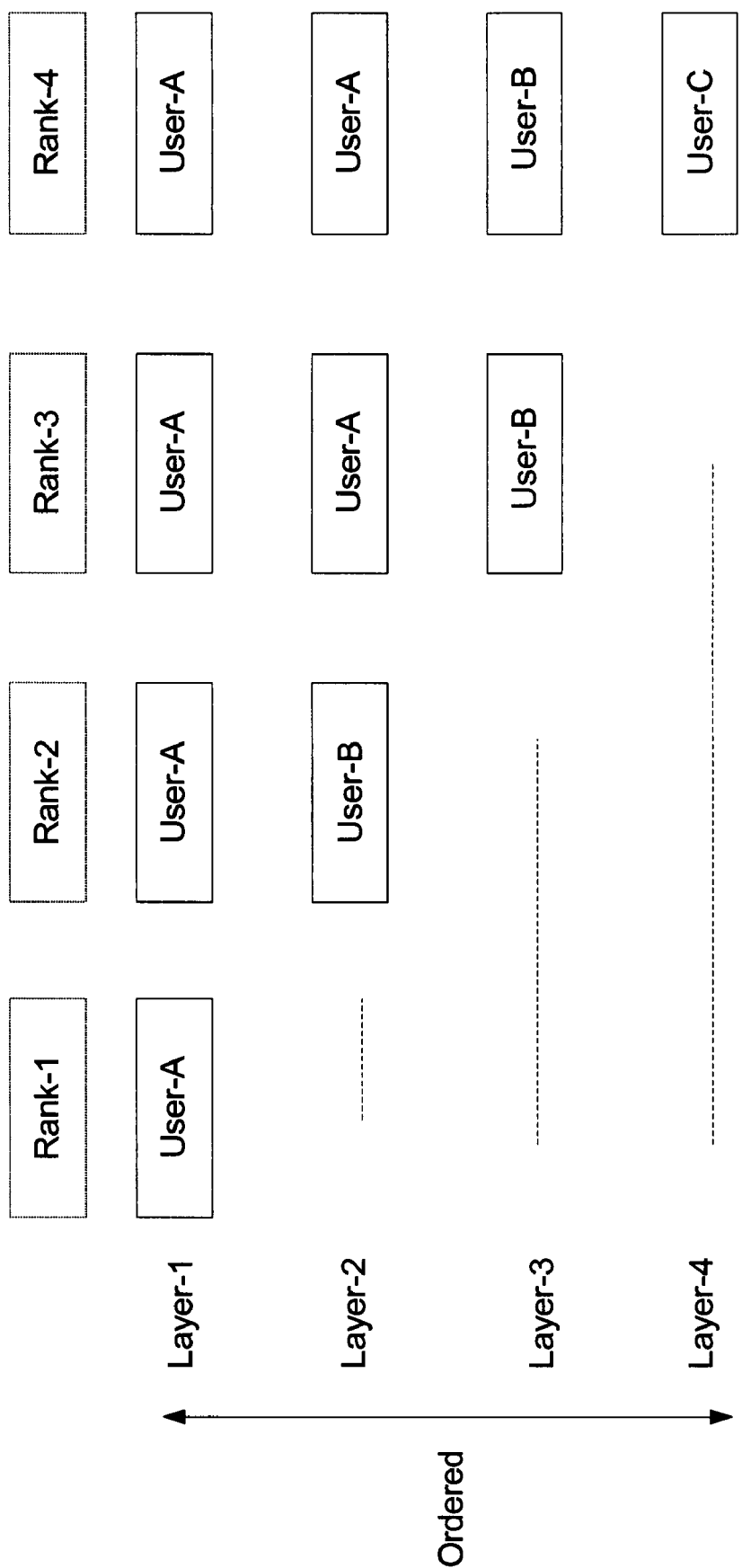

Another embodiment of the current invention is shown in FIG. 17. In this case, the Node-B has full flexibility in scheduling, pairing and mapping the users to available MIMO layers. For example, under Rank-3, first user can be allocated two layers and the second user a single layer or vice versa. Similarly, under Rank-4 transmissions, the four MIMO layers can be shared among multiple users with potentially multiple layers allocated to a single user. Note that for users to be paired in a MU-MIMO way as described in FIG. 17, they need to report rank on corresponding antennas.

TABLE 4

Codebook for 4-Tx antennas MU-MIMO

| | Codebook | Codebook Size |
|---|---|---|
| Full codebook | $\begin{bmatrix}1\\1\\1\\1\end{bmatrix}, \begin{bmatrix}1\\j\\-1\\-j\end{bmatrix}, \begin{bmatrix}1\\-1\\1\\-1\end{bmatrix}, \begin{bmatrix}1\\-j\\-1\\j\end{bmatrix}, \begin{bmatrix}1\\1\\1\\-1\end{bmatrix}, \begin{bmatrix}1\\j\\-1\\j\end{bmatrix}, \begin{bmatrix}1\\-1\\1\\1\end{bmatrix}, \begin{bmatrix}1\\-j\\-1\\-j\end{bmatrix}, \ldots$ $\begin{bmatrix}1\\1\\j\\j\end{bmatrix}, \begin{bmatrix}1\\j\\-j\\1\end{bmatrix}, \begin{bmatrix}1\\-1\\j\\-j\end{bmatrix}, \begin{bmatrix}1\\-j\\-j\\-1\end{bmatrix}, \begin{bmatrix}1\\1\\-j\\-j\end{bmatrix}, \begin{bmatrix}1\\j\\j\\-1\end{bmatrix}, \begin{bmatrix}1\\-1\\-j\\j\end{bmatrix}, \begin{bmatrix}1\\-j\\j\\1\end{bmatrix}$ | 16 |
| Example Set of sub-codebooks | $\left\{\begin{bmatrix}1&1&1&1\\1&j&-1&-j\\1&-1&1&-1\\1&-j&-1&j\end{bmatrix}\right\}, \left\{\begin{bmatrix}1&1&1&1\\1&j&-1&-j\\1&-1&1&-1\\-1&j&1&-j\end{bmatrix}\right\}, \left\{\begin{bmatrix}1&1&1&1\\1&j&-1&-j\\j&-j&j&-j\\j&1&-j&-1\end{bmatrix}\right\}, \left\{\begin{bmatrix}1&1&1&1\\1&j&-1&-j\\-j&j&-j&j\\-j&-1&j&1\end{bmatrix}\right\}$ $\left\{\begin{bmatrix}1&1\\1&j\\1&-1\\1&-j\end{bmatrix}\right\}, \left\{\begin{bmatrix}1&1\\-1&-j\\1&-1\\-1&j\end{bmatrix}\right\}$ | 4/3/2/1 |

(more subset codebooks are possible)

Note that for notational brevity, a scaling factor normalizing each codebook element has been intentionally omitted from the table. This scaling factor ensures the total transmit power is constant regardless of which precoder element is selected.

Figure 18:
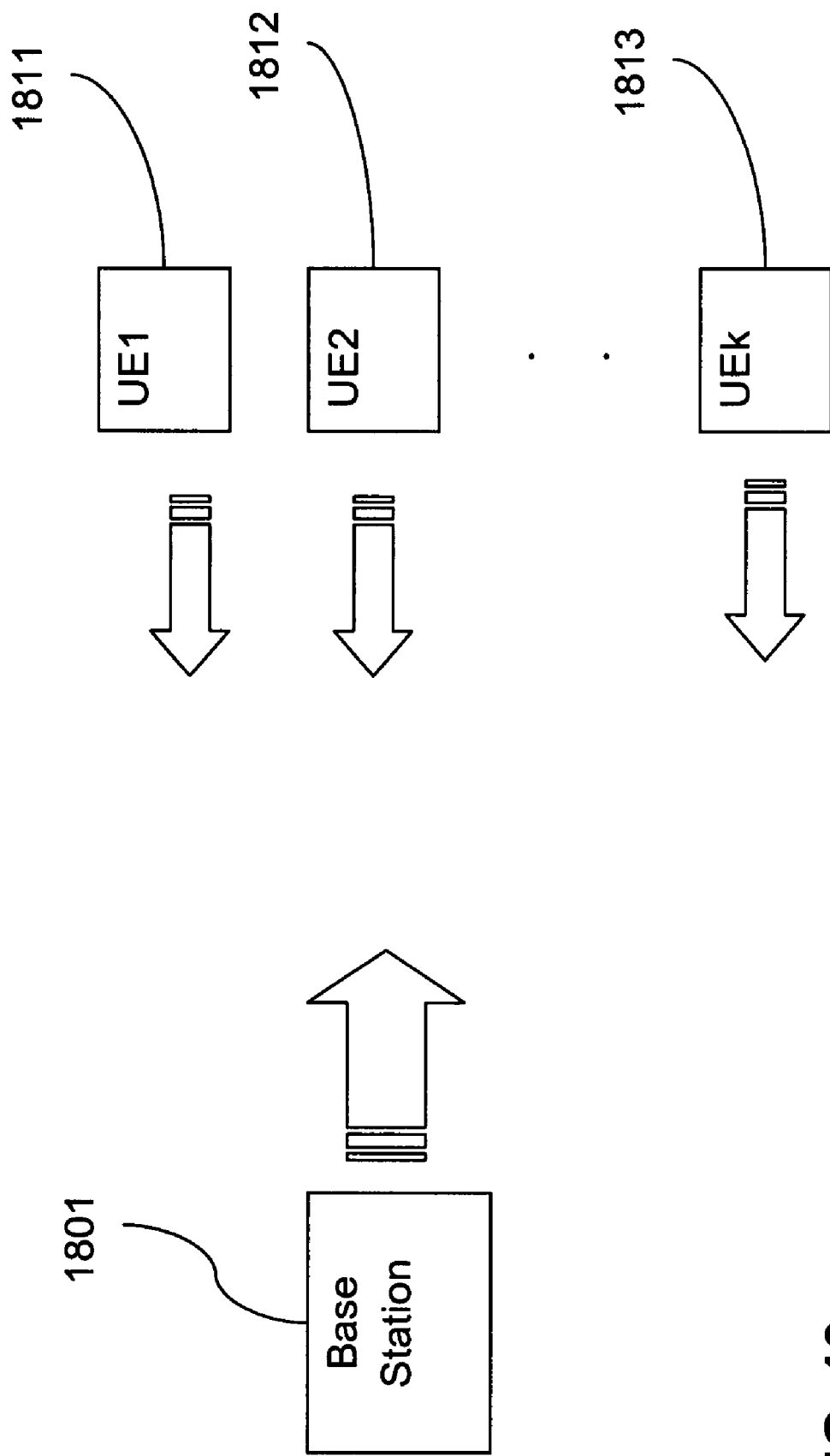
FIG. 18 shows multi-user MIMO system that employs the feedback and transmission scheme of the present invention.

In case of multi-user MIMO, Node-B has the rank, ordering and channel quality information from multiple UEs according to the feedback structure described previously. For example, when a 4×4 UE reports a rank of 2 along with the layer order information and CQI (Max-CQI+Delta-CQI), the Node-B can schedule this UE in a single-user or multi-user The feedback and transmission processes described above are operated by the base station. A multi-user MIMO system that employs the processes of the present invention is shown in FIG. 18. Base station 1801 knows how many active UEs 1811 through 1813 are in the cell. It can then broadcast the current codebook (subset or full codebook) to all the UEs 1811 through 1813 in the cell by using the broadcast control channel. Each of UEs 1811 through 1813 calculates CQI and sends feedback signal to base station 1801.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method for feedback and transmission in a wireless communication system, the method comprising:
    selecting, at a base station, one of a subset codebook and a full codebook, the selected codebook having at least one spatial codeword vector that represents a codeword;
    broadcasting the selected codebook to at least one user equipment from the base station;
    calculating, at the user equipment, a channel quality indicator of the at least one spatial codeword vector;
    sending a feedback signal from the user equipment to the base station, the feedback signal including information of the channel quality indicator of the spatial codeword vector and a preferred precoder of the user equipment;
    assigning, at the base station, a first spatial codeword vector to the user equipment;
    transmitting the preferred precoder of the user equipment and data to the user equipment; and
    selecting, at the user equipment, a largest channel quality indicator among the calculated channel quality indicators, the information of the channel quality indicator included in the feedback signal including the largest channel quality indicator, the assigned first spatial codeword vector corresponding to the largest channel quality indicator for the user equipment.

2. The method of claim 1, further comprising: reporting, via the user equipment, a preferred spatial codeword vector to the base station, the preferred spatial codeword vector corresponding to the largest channel quality indicator.

3. The method of claim 1, comprised of the step of selecting one of the subset codebook and the full codebook comprising:
    estimating traffic load;
    selecting subset codebook if a high traffic load is estimated; and
    selecting full codebook if a low traffic load is estimated.

4. The method of claim 1, comprised of the step of selecting one of the subset codebook and the full codebook comprising:
    semi-statically selecting one of the subset codebook and the full codebook.

5. The method of claim 1, wherein if the subset codebook is selected, the method further comprising:
    generating a plurality of subset codebooks; and
    selecting, via a base station, a subset codebook from the plurality of subset codebooks.

6. The method of claim 1, wherein the base station has at least one first antenna, the size of the selected codebook being equal to or less than the number of the first antenna.

7. The method of claim 1, comprised of the feedback signal further including a preceding vector index.

8. The method of claim 1, comprised of the feedback signal further including a rank and layer index and an index of channel quality indicator gaps.

9. The method of claim 1, comprised of the feedback signal further including a layer index and an index of channel quality indicator gaps.

10. The method of claim 1, comprised of the feedback signal further including a first order decreased layer index and an index of channel quality indicator gaps.

11. The method of claim 1, comprised of the feedback signal further including a first decreased layer index, an index of channel quality indicator gaps, and an index of cumulative channel quality indicator gaps.

12. The method of claim 1, comprised of the feedback signal further including a second order decreased layer index, an index of channel quality indicator gaps, and a cumulative channel quality indicator gaps.

13. A method for feedback and transmission in a wireless communication system, the method comprising:
    selecting, at a base station, one of a subset codebook and a full codebook, the selected codebook having a plurality of spatial codeword vectors, each of which represents a codeword;
    broadcasting the selected codebook to a plurality of user equipments from the base station;
    calculating, at each of the user equipments, channel quality indicators of the spatial codeword vectors;
    sending a feedback signal from each of the user equipments to the base station, the feedback signal of the each of the user equipments including information of the channel quality indicators and a preferred precoder of the each of the user equipments;
    selecting, at the base station, a first group of user equipments among the plurality of the user equipments, each of the user equipments in the first group being assigned with a first spatial codeword vector;
    transmitting the preferred precoder of the each of the user equipments in the first group and data for the each of the user equipments in the first group; and
    selecting, at the user equipment, a largest channel quality indicator among the calculated channel quality indicators, the information of the channel quality indicator included in the feedback signal including the largest channel quality indicator.

14. The method of claim 13, wherein the number of the user equipments selected in the first group is equal to or smaller than the size of the selected codebook.

15. The method of claim 13, further comprising:
    reporting, via the user equipment, a preferred spatial codeword vector to the base station, the preferred spatial codeword vector corresponding to the largest channel quality indicator.

16. The method of claim 13, comprised of the step of selecting one of the subset codebook and the full codebook comprising:
    estimating traffic load;
    selecting subset codebook if a high traffic load is estimated; and
    selecting full codebook if a low traffic load is estimated.

17. A method for operating a base station for use in a wireless communication system, the method comprising:
    selecting one of a subset codebook and a full codebook, the selected codebook having a plurality of spatial codeword vectors, each of which represents a codeword;
    broadcasting the selected codebook to the plurality of user equipments, channel quality indicators of the spatial codeword vectors being calculated at each of the user equipments;
    receiving a feedback signal from each of the user equipments, the feedback signal of the each of the user equipments including information of the channel quality indicators and a preferred precoder of the each of the user equipments;
    selecting a first group of user equipments among the plurality of the user equipments, each of the user equipments in the first group being assigned with a first spatial codeword vector;
    transmitting the preferred precoder of the each of the user equipments in the first group and data for the each of the user equipments in the first group; and selecting, at the user equipment, a largest channel quality indicator among the calculated channel quality indicators, the information of the channel quality indicator included in the feedback signal including the largest channel quality indicator.

18. The base station of claim 17, wherein the base station has at least one first antenna, the size of the selected codebook being equal to or less than the number of the first antenna.

19. The base station of claim 17, wherein the number of the user equipments selected in the first group is equal to or smaller than the size of the selected codebook.

20. The base station of claim 17, the operation further comprising: reporting, via the user equipment, a preferred spatial codeword vector to the base station, the preferred spatial codeword vector corresponding to the largest channel quality indicator.

21. The base station of claim 17, comprised of the operation of selecting one of the subset codebook and the full codebook comprising:

estimating traffic load;

selecting subset codebook if a high traffic load is estimated; and selecting full codebook if a low traffic load is estimated.

* * * * *

UNITED STATES PATENT AND TRADEMARK OFFICE
CERTIFICATE OF CORRECTION

PATENT NO. : 7,649,831 B2
APPLICATION NO. : 11/979266
DATED : January 19, 2010
INVENTOR(S) : Cornelius Van Rensburg, Jianzhong Zhang and Farooq Khan It is certified that error appears in the above-identified patent and that said Letters Patent is hereby corrected as shown below:

On the Title Page

Item (60), Line 2, delete "31, 2007, provisional application No. 60/942,761" and insert -- 31, 2007, provisional application No. 60/924,761 --.

Signed and Sealed this
Third Day of December, 2019

Andrei Iancu
*Director of the United States Patent and Trademark Office*